US009751054B2

(12) United States Patent
Jin et al.

(10) Patent No.: US 9,751,054 B2
(45) Date of Patent: Sep. 5, 2017

(54) MILK FOAMER

(71) Applicant: UCC Ueshima Coffee Co., Ltd., Hyogo (JP)

(72) Inventors: Huan Jin, Guangdong (CN); Wanquan Liu, Guangdong (CN); Masaaki Origane, Tokyo (JP); Teruaki Taguchi, Kanagawa (JP); Hideaki Kishi, Tottori (JP)

(73) Assignee: UCC Ueshima Coffee Co., Ltd., Hyogo (JP)

( * ) Notice: Subject to any disclaimer, the term of this patent is extended or adjusted under 35 U.S.C. 154(b) by 56 days.

(21) Appl. No.: 14/772,362

(22) PCT Filed: Mar. 5, 2014

(86) PCT No.: PCT/JP2014/055621
§ 371 (c)(1),
(2) Date: Sep. 2, 2015

(87) PCT Pub. No.: WO2014/136833
PCT Pub. Date: Sep. 12, 2014

(65) Prior Publication Data
US 2016/0030900 A1 Feb. 4, 2016

(30) Foreign Application Priority Data

Jun. 8, 2002 (CN) .................... 2013 2 0330547 U
Mar. 7, 2013 (CN) ......................... 2013 1 0072701
(Continued)

(51) Int. Cl.
*A47J 31/00* (2006.01)
*B01F 3/04* (2006.01)
(Continued)

(52) U.S. Cl.
CPC .......... *B01F 3/04453* (2013.01); *A47J 31/00* (2013.01); *A47J 31/4403* (2013.01);
(Continued)

(58) Field of Classification Search
CPC ..... B01F 3/04; B01F 3/04453; A47J 31/4403; A47J 31/4407; A47J 31/00; A47J 43/0465
(Continued)

(56) References Cited

U.S. PATENT DOCUMENTS 6,616,324 B1    9/2003 Planca et al.
9,107,533 B2 *  8/2015 Volz ...................... A47J 27/004
(Continued)

FOREIGN PATENT DOCUMENTS

CN    101951817 A    1/2011
CN    202723654 U    2/2013
(Continued)

OTHER PUBLICATIONS

Office Action in Canadian Patent Application No. 2,902,410, dated Jun. 14, 2016.
(Continued)

*Primary Examiner* — Robert A Hopkins
(74) *Attorney, Agent, or Firm* — Foley & Lardner LLP; Antoinette F. Konski; Peng Sun

(57) ABSTRACT

The present invention provides a milk foamer that implements simplification of a configuration of a cup lid, and reduces contamination and corrosion to a drive mechanism or a junction. A milk foamer includes a base body 1, a cup body 2 placed on the base body 1, a cup lid 3 placed on the cup body 2, and a stirring mechanism 5 configured to stir milk in the cup body 2, wherein the stirring mechanism 5 includes a stirring head 50 and a shaft 51 for supporting the
(Continued)

stirring head 50, and a magnetic drive mechanism configured to magnetically drive the stirring head 50 is provided to the base body 1.

14 Claims, 27 Drawing Sheets

(30) Foreign Application Priority Data

| Mar. 7, 2013 | (CN) | 2013 2 0103994 U |
| Mar. 7, 2013 | (CN) | 2013 2 0104108 U |
| Mar. 7, 2013 | (CN) | 2013 2 0104219 U |
| Mar. 13, 2013 | (CN) | 2013 2 0113314 U |
| Jul. 19, 2013 | (CN) | 2013 1 0304965 |
| Jul. 19, 2013 | (CN) | 2013 2 0431680 U |

(51) Int. Cl.
*A47J 43/046* (2006.01)
*A47J 31/44* (2006.01)

(52) U.S. Cl.
CPC ....... *A47J 31/4407* (2013.01); *A47J 43/0465* (2013.01); *B01F 2215/0006* (2013.01)

(58) Field of Classification Search
USPC ........................................................ 99/323.1
See application file for complete search history.

(56) References Cited

U.S. PATENT DOCUMENTS

| 2002/0196705 A1 | 12/2002 | Jersey et al. |
| 2005/0206260 A1 | 9/2005 | Akiyama |
| 2010/0038462 A1 | 2/2010 | Kolar et al. |
| 2010/0326284 A1 | 12/2010 | Volz et al. |
| 2011/0041704 A1 | 2/2011 | Feierabend |
| 2013/0042767 A1 | 2/2013 | Alet Vidal et al. |

FOREIGN PATENT DOCUMENTS

| JP | 55-028359 | | 2/1980 |
| JP | 55-028359 | A | 2/1980 |
| JP | 01-243390 | A | 9/1989 |
| JP | 03-028917 | Y2 | 6/1991 |
| JP | 05-022254 | Y2 | 6/1993 |
| JP | 07-022144 | Y2 | 5/1995 |
| JP | 08-332398 | A | 12/1996 |
| JP | 11-221160 | A | 8/1999 |
| JP | 2005-269709 | A | 9/2005 |
| JP | 2008-519621 | A | 6/2008 |
| JP | 2010-022676 | A | 2/2010 |
| JP | 2010-527671 | A | 8/2010 |
| JP | 2011-156200 | A | 8/2011 |
| JP | 2012-500042 | A | 1/2012 |
| WO | WO-2006/050900 | A1 | 5/2006 |
| WO | WO-2008/142154 | A1 | 11/2008 |
| WO | WO-2009/097705 | A1 | 8/2009 |
| WO | WO-2009/135759 | A1 | 11/2009 |
| WO | WO-2011/153587 | A1 | 12/2011 |
| WO | WO-2012/076848 | A1 | 6/2012 |

OTHER PUBLICATIONS

Supplementary European Search Report issued in application No. 14761055 dated Oct. 5, 2016.
English Translation of the International Preliminary Report on Patentability (ISA/JP) for International Application No. PCT/JP2014/055621, mailed Sep. 17, 2015, 12 pages.
Extended European Search Report for European Patent Application No. 14761055.4, mailed Jan. 30, 2017.
Office Action in Korean Patent Application No. 10-2015-7027775, dated Jan. 25, 2017.
Coffee Avenue, Melitta, MJ-121 (retrieved on Feb. 9, 2014) Website, http://shamsu.fc2web.com/goods/me__mj121.html.
International Search Report (ISA/JP) for International Application No. PCT/JP2014/055621, mailed Jun. 3, 2014, 4 pages.
First Office Action in Taiwanese Patent Application No. 103107963, dated Jun. 26, 2017.

* cited by examiner

MILK FOAMER

CROSS-REFERENCE TO RELATED APPLICATIONS

This application is a national stage application under 35 U.S.C. §371 of International Application No. PCT/JP2014/055621, filed Mar. 5, 2014, which in turn claims priority to Chinese Application No. 201320104108.6, filed Mar. 7, 2013, Chinese Application No. 201310072701.1, filed Mar. 7, 2013, Chinese Application No. 201320104219.7, filed Mar. 7, 2013, Chinese Application No. 201320103994.0, filed Mar. 7, 2013, Chinese Application No. 201320113314.3, filed Mar. 13, 2013, Chinese Application No. 201320330547.9, filed Jun. 8, 2013, Chinese Application No. 201320431680.3, filed Jul. 19, 2013, and Chinese Application No. 201310304965.5, filed Jul. 19, 2013, the content of each of which is incorporated herein by reference in its entirety.

TECHNICAL FIELD

The present invention relates to a milk foamer including a base body, a cup body placed on the base body, a cup lid placed on the cup body, and a stirring mechanism configured to stir milk in the cup body.

BACKGROUND ART

With the rise in living standards, needs of heating and stirring beverage, especially needs for foam milk, have been growing. Foam milk created by stirring and foaming milk (milk) is used for coffee beverage such as cappuccino.

A milk foamer disclosed in Non-Patent Document 1 below has been known as a milk foamer for creating such foam milk. This device includes a cup body and a cup lid, wherein a heating device for milk is provided to the cup body, and a stirring mechanism for stirring milk is provided to the cup lid. A drive mechanism and an actuator for rotatably driving a stirring head provided to the stirring mechanism are mounted inside the cup lid.

Power for operating the drive mechanism has to be supplied from the cup body. On the other hand, the cup lid has to be mounted detachably to the cup body. Therefore, a junction for allowing the cup body and the cup lid to be electrically connected to each other with a power source supply terminal is provided between the cup body and the cup lid. When a switch provided to the cup body is turned on, heating with the heating device and the power supply to the drive mechanism on the cup lid are performed to implement a stirring operation of milk.

PRIOR ART DOCUMENTS

Non-Patent Document

Non-Patent Document 1: Coffee Avenue (retrieved on Feb. 9, 2014) http://shamsu.fc2web.com/goods/me_mj121.html

SUMMARY OF THE INVENTION

Problems to be Solved by the Invention

However, the above background art has the following problem. When the actuator and the drive mechanism are mounted on the cup lid, the weight of the cup lid increases to make it difficult to open/close the cup lid. Further, the junction for a power supply is needed, which increases a possibility of malfunction due to contamination or corrosion. In addition, a sealing mechanism is essentially provided to keep the drive mechanism and the actuator out of the steam of the heated milk, and this leads to the complicated structure of the cup lid.

The present invention is accomplished to solve the above problem, and aims to provide a milk foamer which implements simplification of the structure of the cup lid and reduction in contamination or corrosion to the drive mechanism or the junction.

Means for Solving the Problems

In order to solve the above problem, a milk foamer according to the present invention includes:

a base body; a cup body placed on the base body; a cup lid placed on the cup body; and a stirring mechanism configured to stir milk in the cup body, wherein the stirring mechanism includes a stirring head and a shaft for supporting the stirring head, and a magnetic drive mechanism configured to magnetically drive the stirring head is provided to the base body.

The operation and effects according to the configuration described above are as stated below. The stirring mechanism for stirring milk in the cup body includes the shaft and the stirring head. The magnetic drive mechanism for magnetically driving the stirring head is provided to the base body. The magnetic drive mechanism is provided not to the cup lid but to the base body, whereby the weight of the cup lid can be reduced. In addition, a power source supply terminal is not needed between the cup lid and the base body. Further, the magnetic drive mechanism is used to drive the stirring head, whereby the stirring head can be rotated in a non-contact manner. Thus, the configuration described above can provide a milk foamer that implements simplification of a configuration of a cup lid and reduction in contamination and corrosion to a drive mechanism or a junction.

In the present invention, the stirring head preferably includes a first permanent magnet group disposed at equal intervals along a circumferential direction of rotation.

The stirring head can be configured with a simple structure of only disposing permanent magnets at equal intervals in the circumferential direction. The stirring head can also be configured to have a structure in which the permanent magnets are not exposed to the outside, so long as permanent magnets are used. This configuration is advantageous for problems of contamination or the like.

The magnetic drive mechanism according to the present invention preferably includes a second permanent magnet group disposed opposite to the first permanent magnet group, and an actuator for rotating the second permanent magnet group.

As a mechanism for rotatably driving the first permanent magnet group, the second permanent magnet group disposed opposite to the first permanent magnet group can be used. The stirring head can be rotated with magnetic force by the rotation of the second permanent magnet group with the actuator (e.g., electric motor). The drive transmission in the non-contact manner can be implemented with a simple structure.

The stirring head according to the present invention preferably includes a stirring blade disposed around the first permanent magnet group.

With this configuration, the first permanent magnet group and the stirring blade can efficiently be disposed, and the functions of the first permanent magnet group and the stirring blade can sufficiently be exhibited.

The stirring blade according to the present invention is preferably mounted to a support surface formed on a support member supporting the first permanent magnet group.

With this configuration, the support member can support both the permanent magnets and the stirring blade, whereby the configuration can be simplified.

Preferably, one or more types of the stirring head according to the present invention are prepared, and attached to the shaft so as to be exchangeable.

It is preferable that one or more stirring heads are prepared according to types of beverages created by the milk foamer. For example, a stirring head suitable for foam milk and a stirring head suitable for hot milk are respectively prepared, and they are mounted to the shaft so as to be exchangeable as needed. With this configuration, one or more types of beverages can be created, and a stirring operation suitable for the type of beverage can be performed.

Preferably in the present invention, a storage part storing the stirring head is provided to the base body.

In the case where one or more types of stirring heads are prepared, how to keep the stirring head which is not currently used is a problem. With the formation of the storage part on the base body, the stirring head can be stored, and a loss of the stirring head can be prevented.

Preferably in the present invention, the storage part is a storage concave part formed on a bottom of the base body for holding the stirring head with magnetic force.

Since the storage concave part is formed on the bottom of the base body, the stirring head can be stored in a place that does not affect the appearance. The stirring head is held in the storage concave part with magnetic force, whereby the stirring head can be held with a simple structure.

Preferably in the present invention, a heating device is provided to surround the second permanent magnet group.

The second permanent magnet group is preferably disposed as close to the first permanent magnet group as possible. Considering thermal conductivity, the heating device is preferably mounted close to the bottom of the cup body. In view of this, the heating device is mounted around the second permanent magnet group, which can meet both demands.

Preferably in the present invention, a sensor for detecting a presence of the cup body is provided to the base body.

In the configuration in which the cup body can be removed from the base body, a mechanism for detecting the presence of the cup body is provided. This can prevent unnecessary power consumption due to the rotation of the motor when the cup body is not set.

Preferably in the present invention, a heater cover covering a heating surface of the heating device is rotatably and pivotally supported to the base body.

With this configuration, when the cup body is removed, careless touch on the heating surface is inhibited, whereby a risk of burn injury can be eliminated. Since the heater cover is pivotally supported to the base body, usability upon using the cover can be enhanced. Further, this configuration prevents a loss of the heater cover.

Preferably, the cup body according to the present invention includes at least a beverage container, and an upper cup support body and a bottom cup support body which are placed around the beverage container, and the cup body is configured such that a lower end of the bottom cup support body projects from the bottom surface of the beverage container.

When the milk in the beverage container is heated, the bottom surface of the beverage container is in a heated state. It is preferable that, when the cup body is removed from the base body, the bottom surface is difficult to be touched, and the direct contact of the heated bottom surface with a table surface or the like is prevented when the cup body is placed onto a table or the like. In view of this, the lower end of the bottom cup support body is formed to project from the bottom surface of the beverage container. This configuration can solve the above problem.

Preferably, the bottom cup support body according to the present invention is made of a material having flexibility.

Use of such material prevents the temperature rise of the bottom cup support body, even when the milk is heated. Therefore, it is no problem to touch the bottom cup support body with one's hand. Use of such material having flexibility can also improve feeling upon placing the cup body onto a table or the like, when the cup body is placed onto a table or the like.

Preferably in the present invention, a cover member for covering the bottom surface of the beverage container is provided, the cover member being capable of being set to a state to cover the bottom surface and a state to expose the bottom surface.

When the cup body is removed after the milk is heated, the bottom surface of the beverage container is heated. Therefore, the cover member is preferably provided to prevent burn injury. When the cup body is placed onto the base body, the cup body is placed with the bottom surface being exposed. After the cup body is removed from the base body, the bottom surface is covered. With this configuration, the milk foamer can be used with safety.

Preferably, the cover member according to the present invention is rotatably and pivotally supported to the outer surface of the cup body. With this configuration, the cover member and the cup body can be formed integrally, whereby usability can be enhanced.

Preferably, the milk foamer according to the present invention includes a head detection unit detecting whether the stirring head is attached to the shaft or not.

In the configuration in which the stirring head is detachably attached, the stirring operation is likely to be performed with the stirring head not attached to the shaft. In this case, desired foam milk cannot be created. In view of this, the head detection unit is provided to detect whether the stirring head is attached or not. This can prevent malfunction.

MODE FOR CARRYING OUT THE INVENTION

Figure 1:
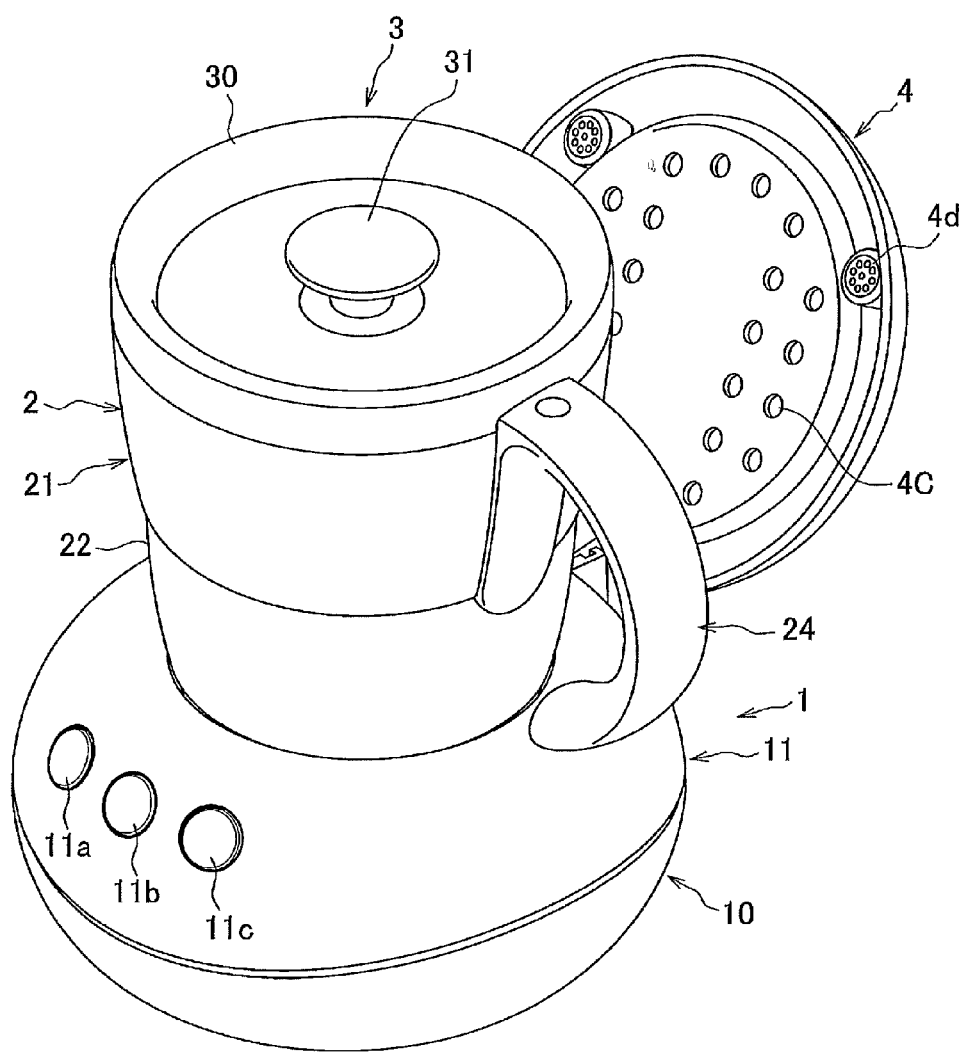
FIG. 1 is a perspective view illustrating an appearance of a milk foamer according to an embodiment of the present invention.
Figure 2A:
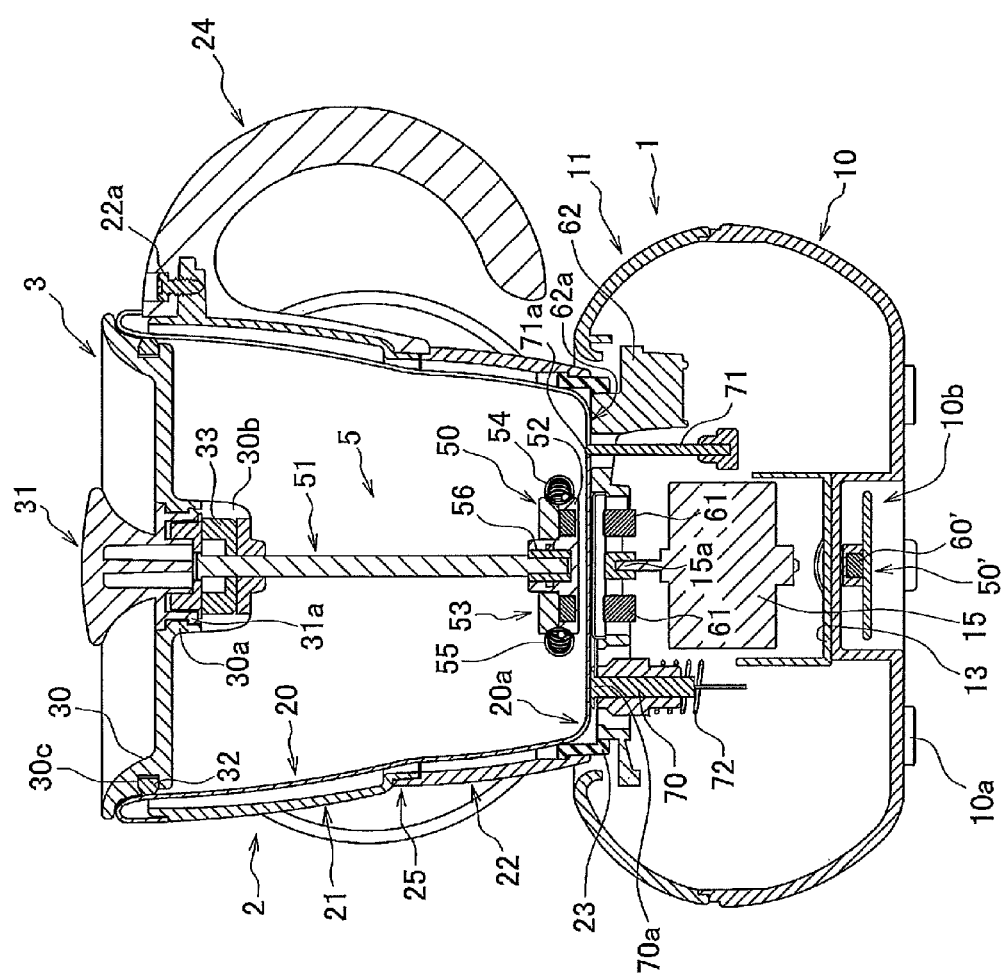
FIG. 2A is a longitudinal cross sectional view of the milk foamer in FIG. 1 (a cross-section through a handle).
Figure 3:
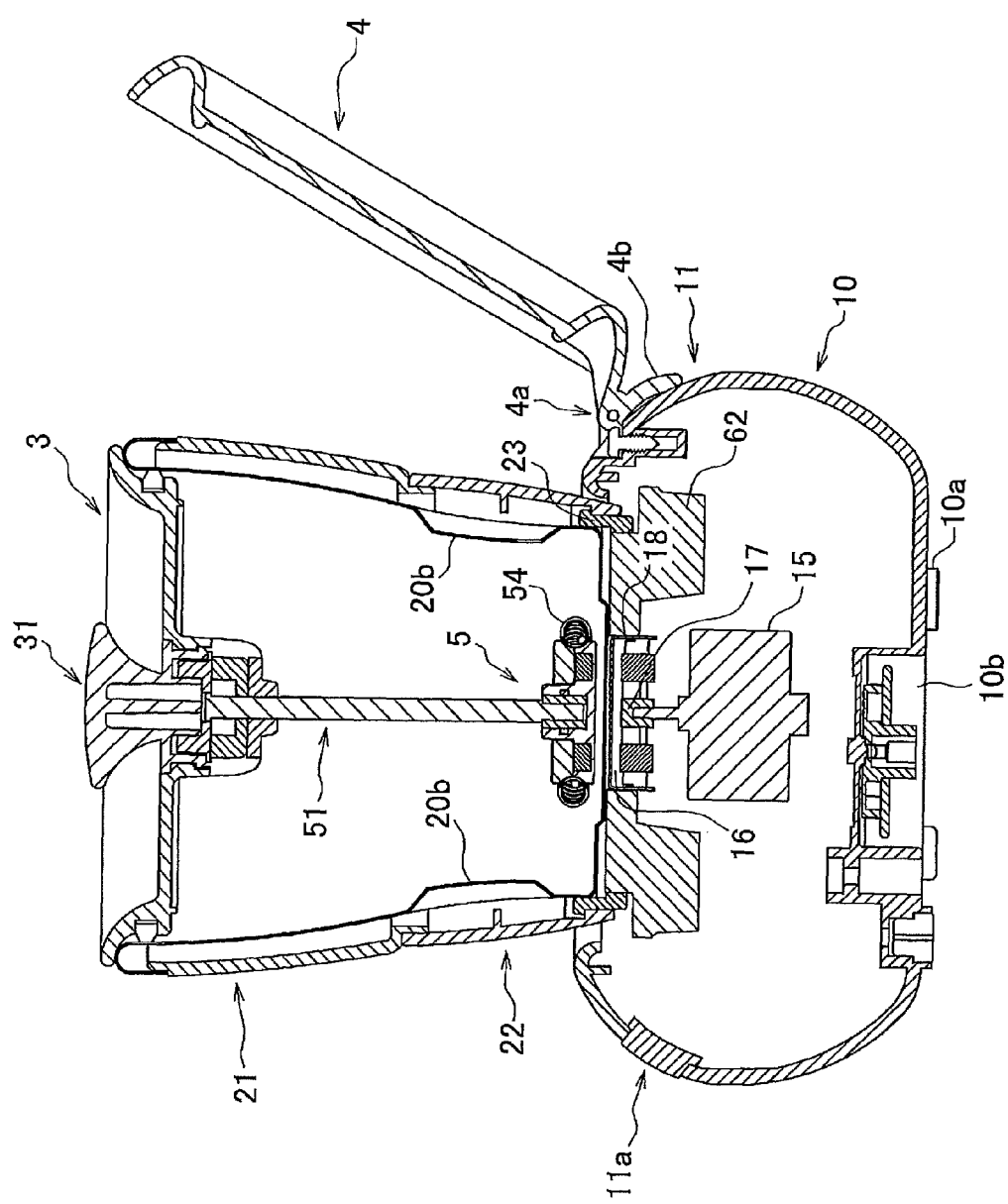
FIG. 3 is a longitudinal cross sectional view of the milk foamer in FIG. 1 (a direction orthogonal to FIG. 2A).

Preferable embodiments of a milk foamer according to the present invention will be described with reference to the drawings. FIG. 1 is a perspective view illustrating an appearance of a milk foamer according to an embodiment of the present invention. FIGS. 2A and 3 are cross sectional views of the milk foamer illustrated in FIG. 1 cut in the vertical direction. FIG. 2A is a view illustrating the milk foamer cut along a plane including a handle, and FIG. 3 is a view cut along a vertical plane orthogonal to the cut plane in FIG. 2A.

<Overall Structure>

The milk foamer is roughly composed of a base body 1, a cup body 2, and a cup lid 3. The base body 1 is composed of a lower base 10 and an upper base 11 coupled to the lower base 10. Three operation units (operation buttons) 11a, 11b, and 11c are provided on the upper base 11. Each of the operation units 11a, 11b, and 11c includes a switch mechanism therein. The lower base 10 and the upper base 11 are coupled to each other with an appropriate method such as a screw.

The operation unit 11a is a button for turning on or off a power source. The operation unit 11b is a button for creating hot milk foamer. The operation unit 11c is a button for creating ice milk foamer. The operation unit 11b is a button for creating both foam milk and foamless hot milk.

The lower base 10 is provided with three legs 10a on its bottom. The legs 10a are made of a material such as a rubber, and can be stably placed on a table or the like. The lower base 10 is also provided with a power source terminal for a power supply from a commercial power source on an appropriate position.

The cup body 2 includes a beverage container 20, an upper cup support body 21 for supporting the beverage container 20, a lower cup support body 22, a bottom cup support body 23, and a handle 24 connected to the upper cup support body 21. A bottom 20a of the beverage container 20 of the cup body 2 is placed on a top surface 62a of a heater 62 provided on the base body 11. A user can detachably set the cup body 2 on the base body 1 by holding the handle 24. The beverage container 20 may be made of a metal such as aluminum or made of resin. Alternatively, the beverage container 20 may be made of a combination of stainless steel and aluminum. For example, the beverage container 20 can be formed by using aluminum, having excellent thermal conductivity, for its bottom, and using stainless steel, which is easy to cut off heat, for its side face. The bonding portion of aluminum and stainless steel can be bonded by welding. With this configuration, when a user puts his/her mouth on the beverage container, he/she does not feel hot on the stainless steel part. Since the bottom is made of aluminum, heat is sufficiently transmitted to the milk in the beverage container, so that the milk can be heated quickly.

A step is formed on the lower part of the upper cup support body 21, and the step is located just on an upper end face of the lower cup support body 22. The handle 24 is connected to the upper cup support body 21 with a screw 22a.

Figure 5:
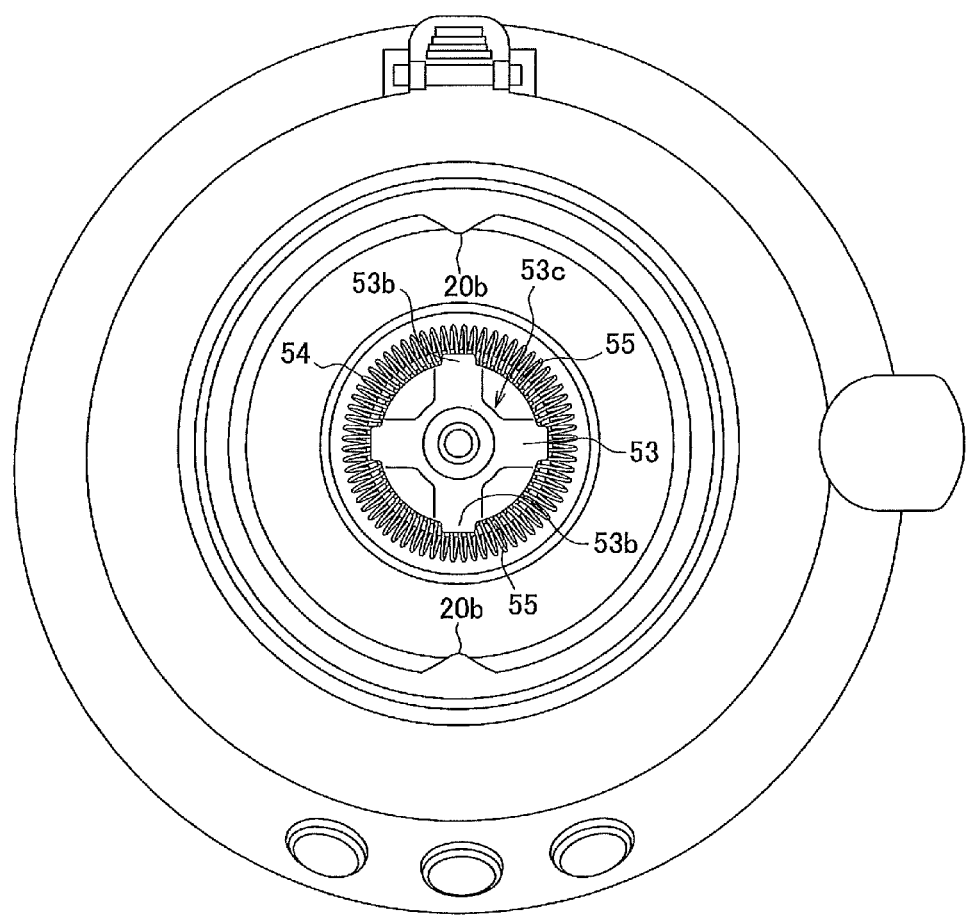
FIG. 5 is a plan view illustrating the detail of a stirring head.

As illustrated in FIGS. 3 and 5, two projections 20b are formed at the inside of the beverage container 20. Each of the projections 20b projects inward from the inner peripheral surface of the beverage container 20, and extends in the vertical direction. As for the height in the vertical direction, the lower part is located slightly above the stirring head 50, and the upper part is located near the boundary between the upper cup support body 21 and the lower cup support body 22. The formation of the projections 20b makes it easy to foam milk with the generation of a turbulent stirring state upon stirring milk. Milk can be largely foamed more with turbulent rotation.

The bottom cup support body 23 is made of a material having flexibility such as a silicon rubber, and it can be placed onto a table or the like when the cup body 2 is removed from the base body 1. Since the bottom 20a (bottom surface) of the beverage container 20 is in a heated state, it is configured to prevent the user from carelessly touching the bottom 20a with his/her hand. The lower end of the bottom cup support body 23 projects from the bottom 20a of the beverage container 20 to make it difficult to be touched. This configuration also prevents the bottom 20a from being in direct contact with a table surface, when the cup body 2 is placed on a table or the like.

The upper cup support body 21 and the lower cup support body 22 are provided to prevent a direct touch on the heated beverage container 20, and they are made of resin having low conduction of heat. Beverage (milk) stored in the cup body 2 can be transferred into a container containing another beverage such as coffee, or the cup body 2 can be used as a beverage cup.

The cup lid 3 includes a lid body 30, a lid handle 31, and a packing 32. The cup lid 3 is provided with a first projecting cylindrical portion 30a projecting toward the beverage container 20 on the center of the lid body 30. The lid handle 31 is provided with an engagement claw 31a engaged with the first projecting cylindrical portion 30a, the lid handle 31 and the engagement claw 31a being integrally formed. A groove 30c is formed on the outer peripheral side surface of the lid body 30, and an annular packing 32 is inserted therein. The packing 32 is in close contact with the upper inner wall of the beverage container 20 to seal the beverage container 20, when the cup lid 3 is attached to the beverage container 20. The lid body 30 is preferably made of a transparent resin in order that it becomes easy to see the inside of the beverage container 20.

<Configuration of Stirring Mechanism>

A stirring mechanism 5 is provided on the bottom surface of the cup lid 3. The cup lid 3 and the stirring mechanism 5 are integrally formed as a unit. When the cup lid 3 is removed from the cup body 2, the stirring mechanism 5 is removed together.

Figure 2B:
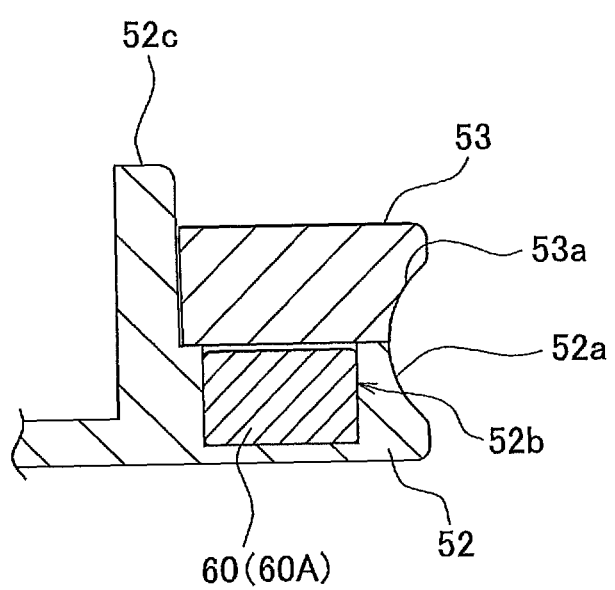
FIG. 2B is an enlarged cross sectional view of an essential part of a magnetic drive mechanism.

The stirring mechanism 5 includes a stirring head 50 and a shaft 51. FIG. 2B is a view illustrating a cross-sectional structure of the stirring head 50 in detail. The stirring head 50 includes a lower first head composing member 52 and an upper second head composing member 53. A first concave part 52a with a cross-section of a quarter of a circle is formed on the outer periphery of the first head composing member 52, and a first concave part 53a with similarly a cross-section of a quarter of a circle is formed on the outer periphery of the second head composing member 53. The second head composing member 53 is made of a magnetic body. When the first and second head composing members 52 and 53 are coupled to each other, a semicircular recess is formed from the first concave part 52a and the second concave part 53a. A stirring blade 54 is inserted into this semicircular recess. The stirring blade 54 is formed into a coil spring shape, and includes a metallic wire 55 formed therein. The stirring blade 54 is fixed to the semicircular recess with this wire 55.

FIG. 5 illustrates the stirring head 50 viewed from top. The second head composing member 53 has a cross shape, and the first concave part 53a is formed on a portion 53b projecting into a cross shape. A recess 53c is formed between the projecting portions 53b.

<Configuration of Magnetic Drive Mechanism>

Figure 6:
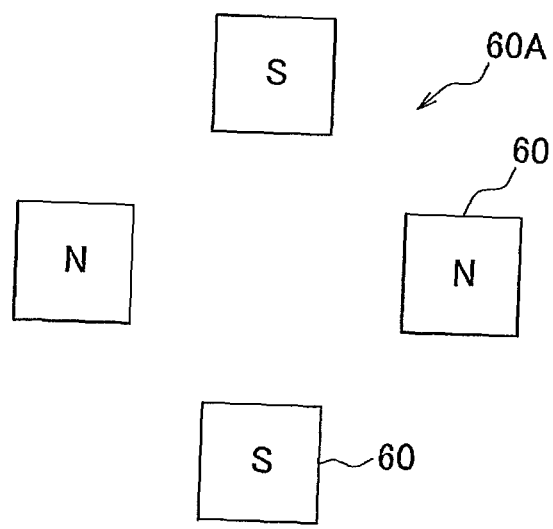
FIG. 6 is a plan view illustrating an arrangement of a permanent magnet group.

Four magnet storing concave parts 52b are formed on the first head composing member 52 along the circumferential direction, and permanent magnets 60 are inserted into the magnet storing concave parts 52b. FIG. 6 illustrates that four permanent magnets 60 are disposed with an interval of 90°, and these four permanent magnets 60 compose a first permanent magnet group 60A. A cylindrical projecting part 52c is formed at the center of the first head composing member 52. The second head composing member 53 is annularly formed, and its inner diameter part is fitted into the cylindrical projecting part 52c.

A connection member 56 includes a surface on which a screw is formed, and the connection member 56 connects the stirring head 50 and the shaft 51 to each other and fixes them. They can be connected to each other with the screw formed on the connection member 56 and a screw formed on the shaft 51.

The shaft 51 is connected to a second projecting cylindrical part 30b, which is integrally formed with the lid body 30, via a bearing 33. With this structure, the shaft 51 and the stirring head 50 are supported so as to be relatively rotatable with respect to the lid body 30.

As illustrated in FIG. 2A, a second permanent magnet group 61A is disposed on the base body 1 so as to be opposite to the first permanent magnet group 60A. The second permanent magnet group 61A is composed of four permanent magnets 61 disposed along the circumferential direction at an interval of 90°, like the first permanent magnet group 60A. The radius of rotation is the same as that of the first permanent magnet group 60A.

The second permanent magnet group 61A is held on the back surface of a plate-type support member 16. A connection member 17 is provided at the center of the support member 16, and a motor shaft 15a of a motor 15 serving as an actuator is fitted into the connection member 17. With this configuration, when the motor 15 is driven, the support member 16 rotates to rotatably drive the second permanent magnet group 61A.

Figure 7:
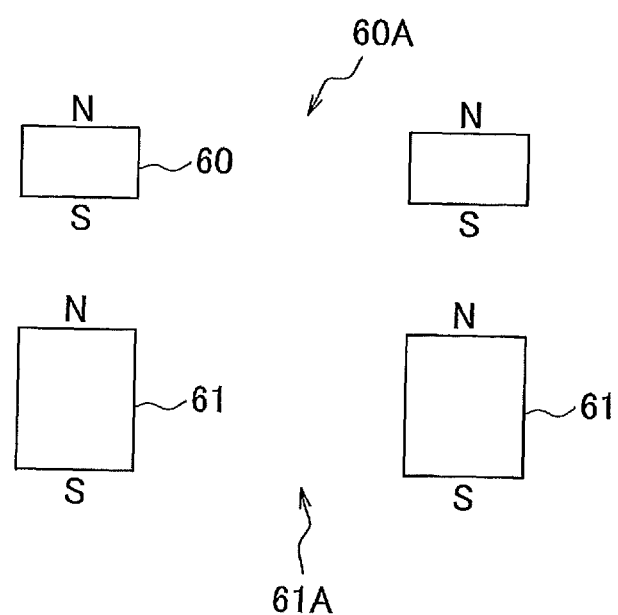
FIG. 7 is a vertical cross sectional view illustrating an arrangement of a permanent magnet group.

FIG. 7 illustrates the arrangement of the first and second permanent magnet groups 60A and 61A in the vertical direction. The first permanent magnet group 60A is disposed such that the permanent magnet 60 whose south pole is directed downward and whose north pole is directed upward and the permanent magnet 60 whose north pole is directed upward and whose south pole is directed downward are alternately disposed along the circumferential direction. Similarly, the second permanent magnet group 61A is disposed such that the permanent magnet 61 whose south pole is directed downward and whose north pole is directed upward and the permanent magnet 61 whose north pole is directed upward and whose south pole is directed downward are alternately disposed along the circumferential direction.

As illustrated in FIG. 7, the beverage container 20 is stably held with the state in which the north pole (south pole) of the first permanent magnet 60 faces the south pole (north pole) of the second permanent magnet 61. When the motor 15 is driven with this state, the first permanent magnet group 60A can be rotatably driven with the rotation of the second permanent magnet group 61A. With this configuration, the stirring head 50 rotates, whereby the milk in the beverage container 20 can be stirred.

Since the north pole and the south pole are alternately disposed along the circumferential direction as illustrated in FIG. 6, the permanent magnets can be disposed with high magnetic flux density.

Figure 8:
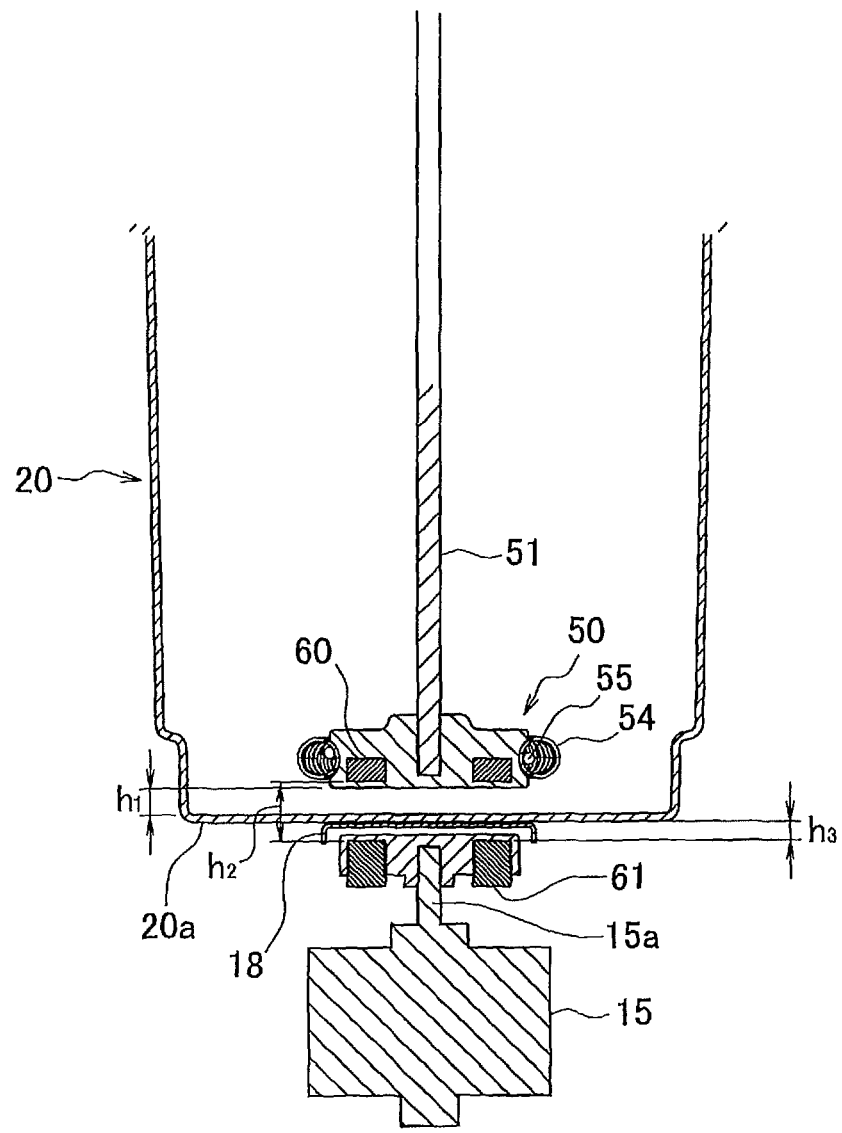
FIG. 8 is a view illustrating a dimensional relation between a first permanent magnet group and a second permanent magnet group in the vertical direction.

FIG. 8 illustrates a distance h1 between the stirring head 50 and the bottom surface 20a of the beverage container 20, a distance h2 between the first permanent magnet group 60A and the second permanent magnet group 61A, and a distance h3 between the second permanent magnet group 61A and the bottom surface 20a of the beverage container 20. A preferable range of h1 is 1 to 8 mm, a preferable range of h2 is 3 to 15 mm, and a preferable range of h3 is 1 to 5 mm.

A more preferable range of h1 is 1.5 to 2 mm, a more preferable range h2 of h2 is 5.1 to 5.9 mm, and a more preferable range of h3 is 2 to 2.3 mm.

When h1 becomes close to 1 mm, the stirring head 50 might tilt with impact upon the stirring operation. Thus, the side of the stirring head 50 scrapes against the bottom 20a of the beverage container 20, which is likely to cause abrasion or damage of the stirring head 50. When h1 exceeds 8 mm, the magnetic force becomes low to deteriorate the function of stirring milk. This results in the inability to sufficiently foam milk.

When h2 becomes less than 3 mm, the magnetic force exerted on the stirring head 50 increases, so that the friction between the stirring head 50 and the beverage container 20 increases. Consequently, the stirring head 50 and the beverage container 20 are worn away to cause a short life-span. When h2 exceeds 15 mm, the magnetic force becomes low to deteriorate the function of stirring milk. This results in the inability to sufficiently foam milk.

When h3 becomes close to 1 mm, the magnetic force exerted on the stirring head 50 increases, so that the friction between the stirring head 50 and the beverage container 20 increases. When h3 exceeds 2.3 mm, the magnetic force becomes low to deteriorate the function of stirring milk.

Figure 4:
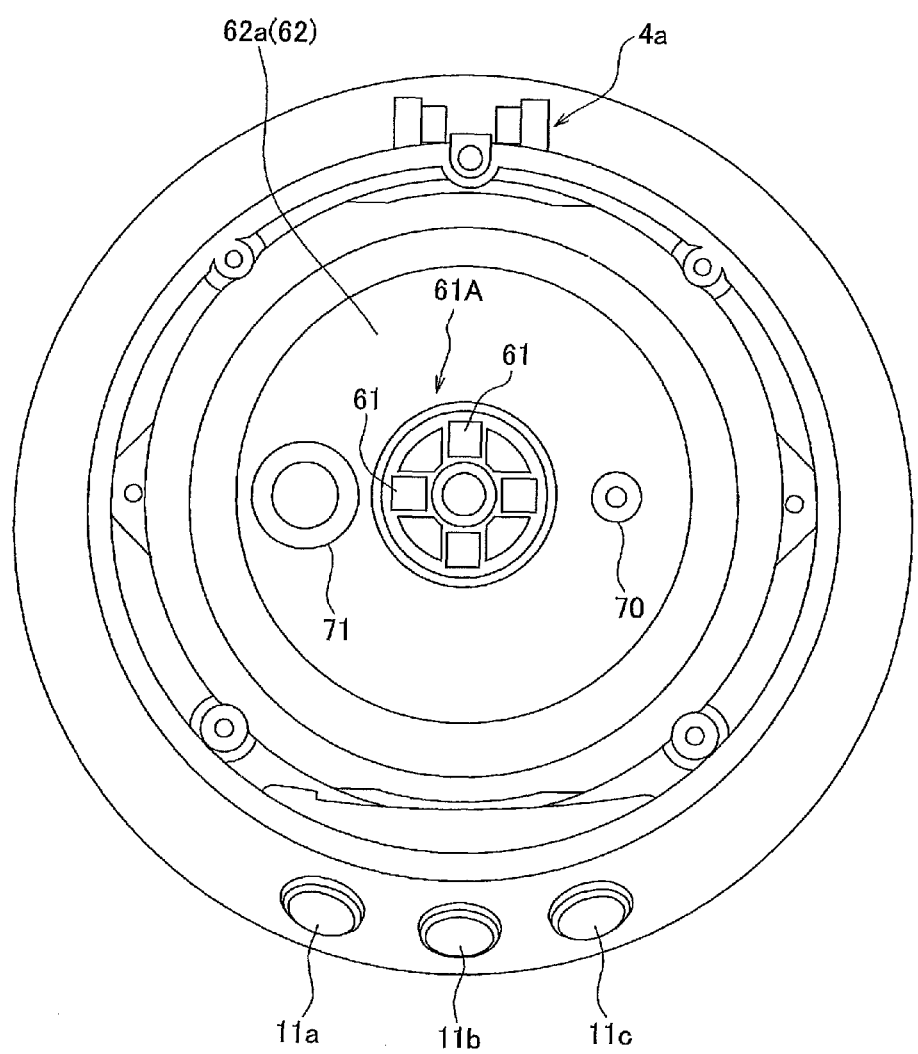
FIG. 4 is a plan view illustrating a state in which a cup lid of the milk foamer in FIG. 1 is removed.

As illustrated in FIG. 2A, a heater (heating device) 62 is provided to enclose the outer periphery of the second permanent magnet group 61A. The bottom surface 20a of the cup body 2 is placed onto a top surface 62a of the heater 62. FIG. 4 is a plan view illustrating the top surface 62a of the heater 62 viewed from top. A magnet cover 18 is provided above the second permanent magnet group 61A, and the magnet cover 18 and the top surface 62a of the heater 62 are flush with each other. Note that FIG. 4 illustrates the state in which the magnet cover 18 is removed.

<Second Stirring Head>

As described above, the stirring head 50 (first stirring head) has a shape suitable for creating foam milk. The milk foamer according to the present invention can create regular hot milk, in addition to foam milk, and for this, a stirring head with a different structure is used. As previously described, the shaft 51 and the connection member 56 are connected to each other with a screw, so that the stirring head 50 can be replaced with another one.

Figure 18:
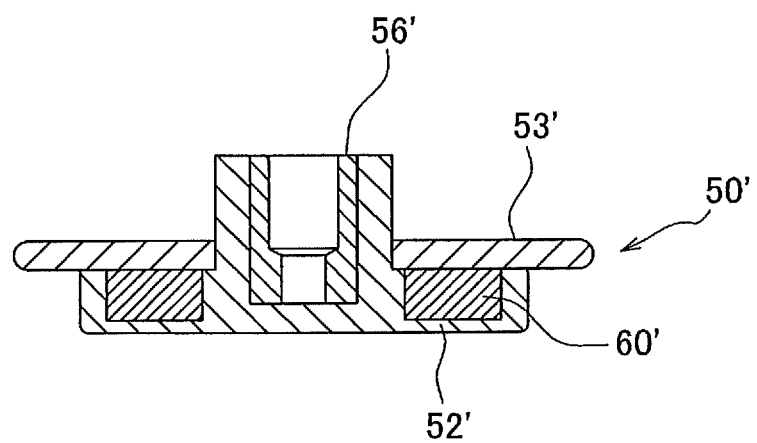
FIG. 18 is a view illustrating a stirring head for hot milk.

FIG. 18 is a view illustrating a stirring head 50' (second stirring head) for hot milk. This stirring head is different from the one for foam milk in that it does not include the stirring blade 54. A connection member 56', a first head composing member 52', and a second head composing member 53' are basically the same. The number and arrangement of the permanent magnet 60' are the same as those for the first stirring head 50.

<Storage of Stirring Head>

When two stirring heads 50 are used as described above, the stirring head 50' which is one of the stirring heads is not used. As illustrated in FIG. 2A, a storage concave part 10b is formed on the lower base 10 of the base body 1. A frame member 13 made of a magnetic body such as stainless steel is provided at the opposite side (inside) on the bottom of the storage concave part 10b. Since the stirring head 50 includes the permanent magnets 60, the storage concave part 10b can hold the stirring head with the magnetic force.

<Configuration of Heater Cover>

Figure 9:
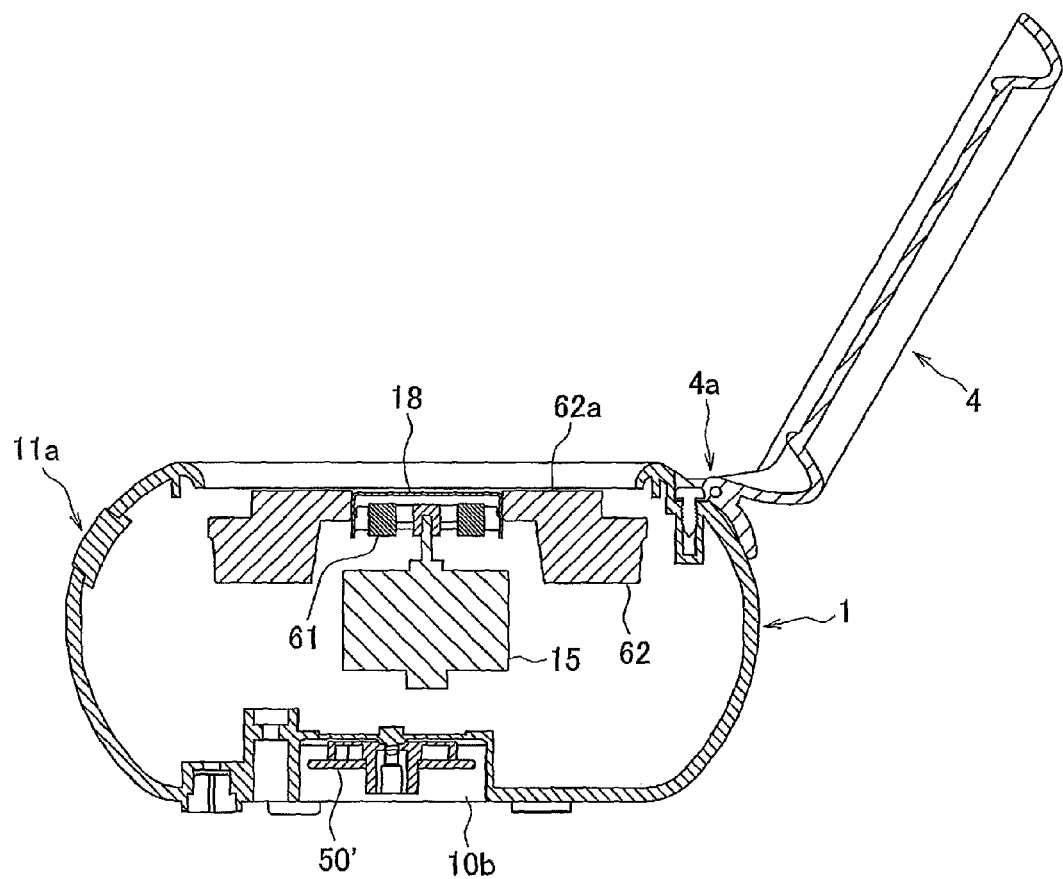
FIG. 9 is a view illustrating a state in which the cup body is removed.
Figure 10:
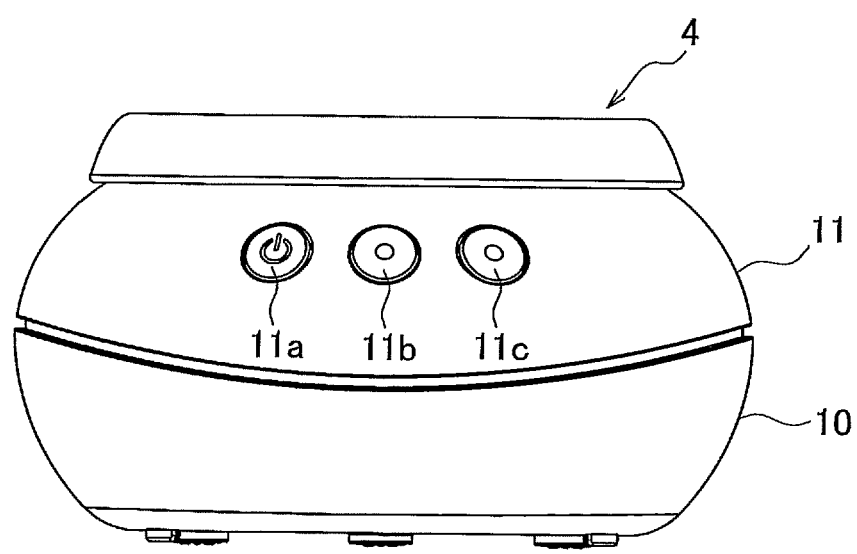
FIG. 10 is a view illustrating a state in which a heating surface is covered with a lid.

FIG. 9 is a view illustrating a state in which the cup body 2 is removed from the base body 1. When the cup body 2 is removed after milk in the cup body 2 is heated, the top surface 62a of the heater 62 is exposed, and a careless touch with one's hand might cause a risk of burn injury. For this problem, the heater cover 4 is provided. The heater cover 4 is rotatably and pivotally supported about a hinge shaft 4a. The hinge shaft 4a is provided on the upper base 11 of the base body 1. A restriction portion 4b is integrally formed with the heater cover 4, so that the heater cover 4 is stably supported with the state illustrated in FIG. 3. FIG. 10 illustrates the covering state of the heater cover 4.

As illustrated in FIG. 1, the heater cover 4 is provided with a lot of small holes 4c. These holes are formed for heat release. Elastic members 4d are provided on three positions on the back surface of the heater cover 4. These members serve as a cushion upon the covering as illustrated in FIG. 10. The elastic member 4 is made of a silicon rubber.

<Configuration of Sensor>

As illustrated in FIGS. 2A and 4, a temperature sensor 70 and a cup detection sensor 71 are provided. The temperature sensor 70 is biased upward with a spring 72, and its tip end 70a can be in contact with the bottom surface 20a of the beverage container 20. Thus, the temperature of the milk in the beverage container 20 is detected.

A tip end 71a of the cup detection sensor 71 is also biased upward with a spring, and this tip end 70a can be in contact with the bottom 20a of the beverage container 20. With this configuration, whether the cup body 2 (beverage container 20) is present or not can be detected, whereby the heater 62 is controlled not to be heated when the cup body 2 is absent.

<Control Block Diagram>

Figure 11:
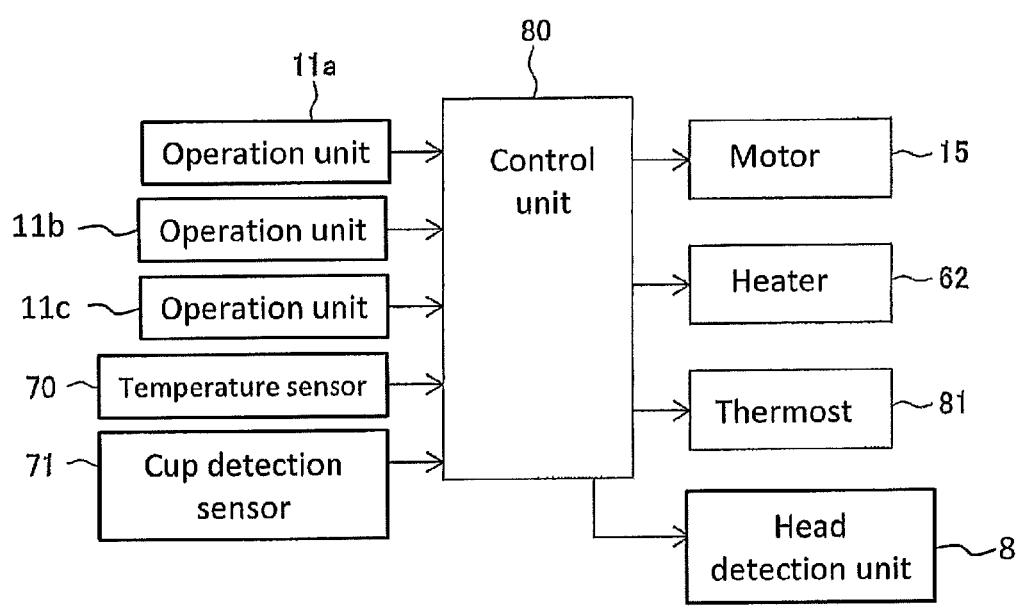
FIG. 11 is a diagram illustrating a control block.

FIG. 11 is a control block diagram. A control unit 80 performs a predetermined control according to a program preliminarily incorporated. The control unit 80 performs a control to the motor 15, the heater 62, and a thermostat 81 according to the operation inputs of the operation units 11a, 11b, and 11c and the detection results of the temperature sensor 70 and the cup detection sensor 71. The control unit 80 also performs a control for a head detection unit 82 to detect the presence of the stirring head 50. When the stirring head 50 is not mounted to the shaft 51, the load of the motor 15 becomes light. Whether the load is heavy or light can be detected from the current value of the motor 15 based on the function of the head detection unit 82.

When it is detected that the stirring head 50 is not mounted to the shaft 51, the drive of the motor is stopped, and an alarm display (e.g., a sound or lamp display) is performed.

<Operation Sequence>

Next, an operation sequence of the milk foamer according to the present embodiment will be described.

<Hot Milk Foam and Hot Milk>

The operation sequence is the same between the case of creating hot milk foam and the case of creating hot milk. In either case, the sequence is started by a pressing operation of the operation unit 11b. However, upon creating hot milk foam, the first stirring head 50 is used, and upon creating hot milk, the second stirring head 50' is used.

Figure 12A:
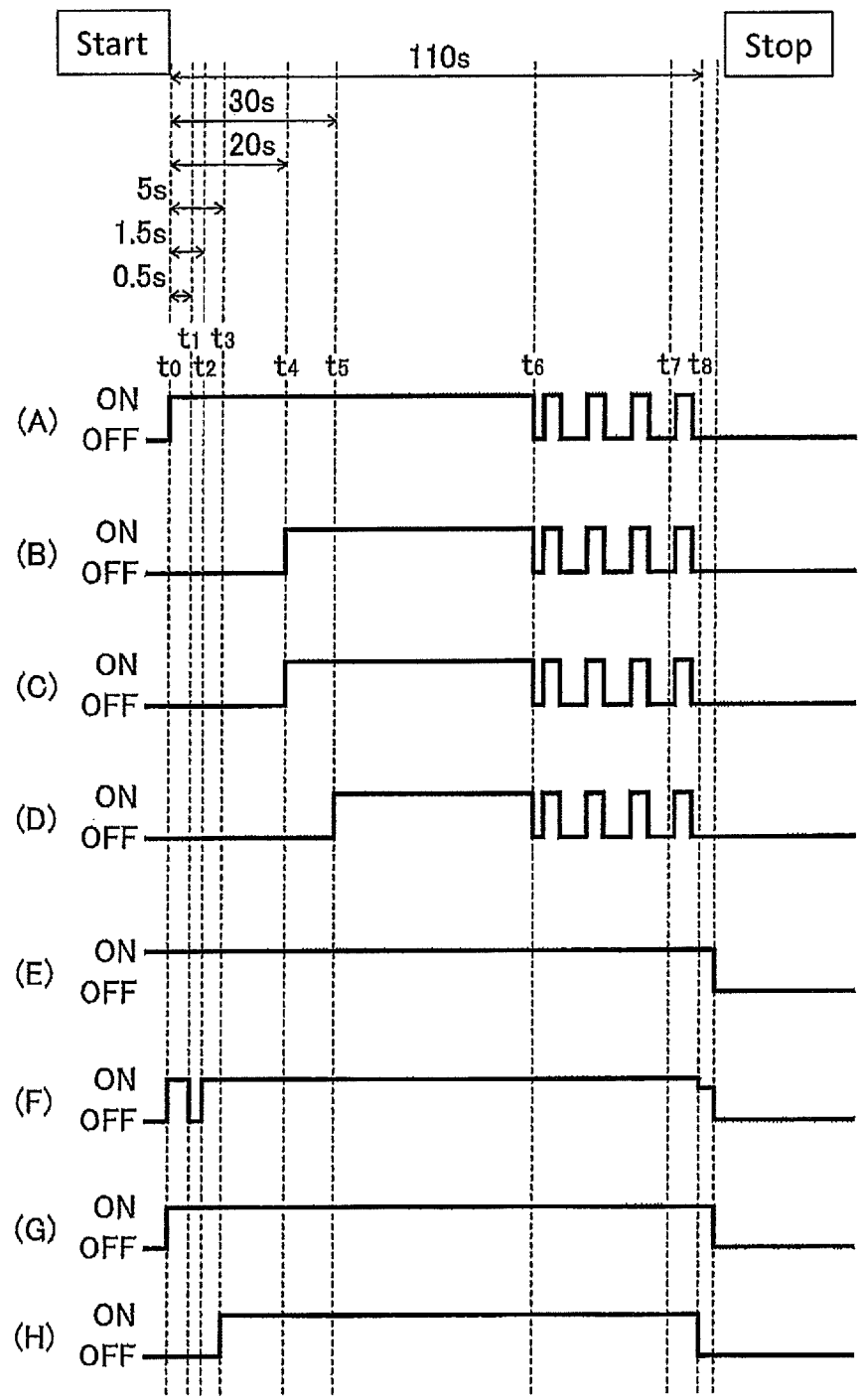
FIG. 12A is a control sequence diagram.

The operation unit 11a is turned on to leave the power on, and then, an appropriate amount of milk is put in the beverage container 20. Then, the cup body 2 is placed onto the base body 1. Subsequently, the operation unit 11b is operated (t0). When the temperature is not more than a predetermined value (e.g., 30° C.) according to the temperature sensor 70, the heater 62 is heated. This operation is illustrated in (A) in FIG. 12A. After a lapse of time t6, the thermostat is on-off controlled. It is set such that the temperature of the milk becomes appropriate (e.g., 62° C.) at the point of the time t6. After the execution of the on-off control for a predetermined time, the heater is stopped (time t7).

In the case where the detection temperature of the temperature sensor exceeds 30° C. and not more than 60° C. when the operation unit 11a is turned on, the heater 62 is started to be heated after a time t4 (e.g., after 20 seconds). This sequence is illustrated in (B). After a lapse of time t6, the thermostat is on-off controlled. The control after the t6 is the same as (A).

(C) illustrates the case where the detection temperature of the temperature sensor exceeds 60° C. when the operation unit 11a is turned on, and the detection temperature is not more than 60° C. after the lapse of 20 seconds from when the operation unit 11a is turned on. The sequence (C) is the same as (B).

(D) illustrates the case where the detection temperature of the temperature sensor exceeds 60° C. when the operation unit 11a is turned on, and the detection temperature also exceeds 60° C. after the lapse of 20 seconds from when the operation unit 11a is turned on. In this case, the heater 62 is started to be heated after a time t5 (e.g., 30 seconds). The subsequent operation is the same as (A), (B), and (C).

A detection sequence by the temperature sensor 70 is illustrated in (E). At a time t8, the detection operation is turned off.

The operation of the motor 15 is illustrated in (F). After the operation of the operation unit 11*b*, the motor 15 is not kept on, but the motor 15 is temporarily turned off at a time t1 (e.g., 0.5 second), and then, turned on at a time t2 (e.g., 1.5 seconds). This is performed for allowing the stirring head 50 to surely follow the rotation of the motor 15 upon rotating the stirring head 50 with the magnetic force of the permanent magnets. Before the motor 15 starts to rotate, the north pole and the south pole of the first permanent magnet group 60A and the second permanent magnet group 61A do not always face each other. Therefore, the motor 15 is rotated for a short time at the beginning, and then, it keeps turned on. This can surely rotate the stirring head 50.

The motor 15 is turned off at a time t8. However, it is not suddenly turned off. The motor 15 is temporarily driven with power of 20 to 80% at the time t7, and then, turned off. This softens impact upon stopping the motor.

The operation of the cup detection sensor 71 is illustrated in (G). To heat the heater 62 and rotate the motor 15, it is necessary that the cup body 2 is detected by the cup detection sensor 71. In the state in which the cup body 2 is not placed on the base body 1, the motor 15 is not rotated, and the heater 62 is not heated. With this configuration, safety is maintained, and unnecessary power consumption is prevented. Accordingly, when the cup body 2 is carelessly removed during the heating of milk, the motor 15 is stopped to stop heating the heater 62.

The detection operation by the head detection unit 82 is started at the time t4 and ends at the time t7. This is for detecting whether the stirring head 50 is mounted or not. The start of the detection is set after a time t3 at which the continuous rotation of the motor 15 is started. When the stirring head 50 is not mounted, the load becomes light, so that the value of the current flowing through the motor 15 becomes not more than a predetermined value. When the stirring head 50 is not mounted, foam milk cannot be created. In view of this, the presence of the stirring head 50 is to be detected.

<Ice Milk Foam>

Figure 12B:
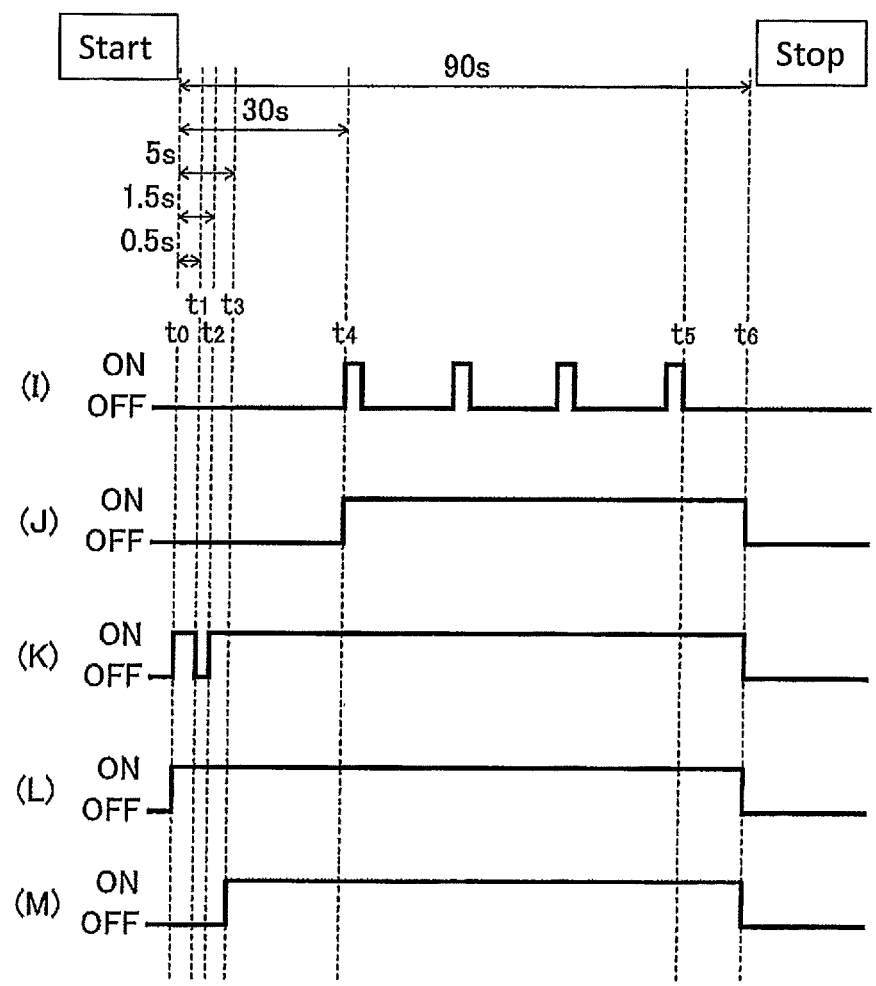
FIG. 12B is a control sequence diagram.

A sequence of creating ice milk foam will next be described with reference to FIG. 12B. A control upon start-up of the motor 15 is illustrated in (K). This is the same as FIG. 12A. The operation of the cup detection sensor 71 is illustrated in (L). This is also basically the same as FIG. 12A. A sequence (M) of the head detection is also the same as FIG. 12A.

To create ice milk foam, the operation unit 11*c* is operated, and the heater 62 is on-off controlled after a lapse of the time t4 (e.g., 30 seconds). This sequence is illustrated in (I). When the temperature detected by the temperature sensor 70 is not more than 30° C. at the time t4, the heater 62 is turned on. Thereafter, 3 second on and 7 second off (pulse drive) are repeated until a time t5. When the temperature is equal to or higher than 30° C. at the time t4, the heater 62 is not heated.

<Another Embodiment of Cup Body>

Figure 19:
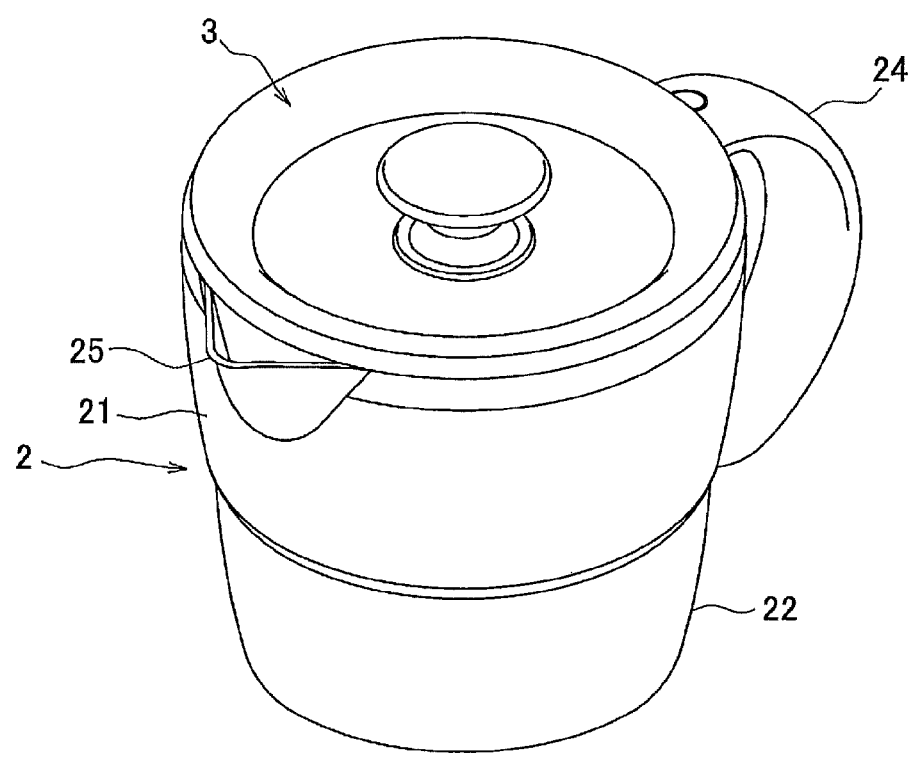
FIG. 19 is a view illustrating another embodiment of a cup body.

FIG. 19 is a view illustrating another embodiment of the cup body 2. In this embodiment, a beak part 25 (guide part) is provided to facilitate pouring of milk into another container. The beak part 25 can be formed integrally with the beverage container 20 or the upper cup support body 21. Alternatively, only the beak part 25 can be formed as a separate member, and attached to a beverage container 20 or an upper cup support body 21 having no beak part. With this configuration, pouring of milk can be facilitated with a cup body 2 having no beak part.

<Configuration of Cover of Cup Body>

Next, a configuration of a cover at the lower part of the cup body 2 will be described. After the milk is heated, the bottom 20*a* of the beverage container 20 of the cup body 2 becomes hot. Therefore, a careless touch with one's hand has to be inhibited. In view of this, a cover member is provided at the lower part of the cup body 2.

<Configuration of Cover According to First Embodiment>

Figure 13A:
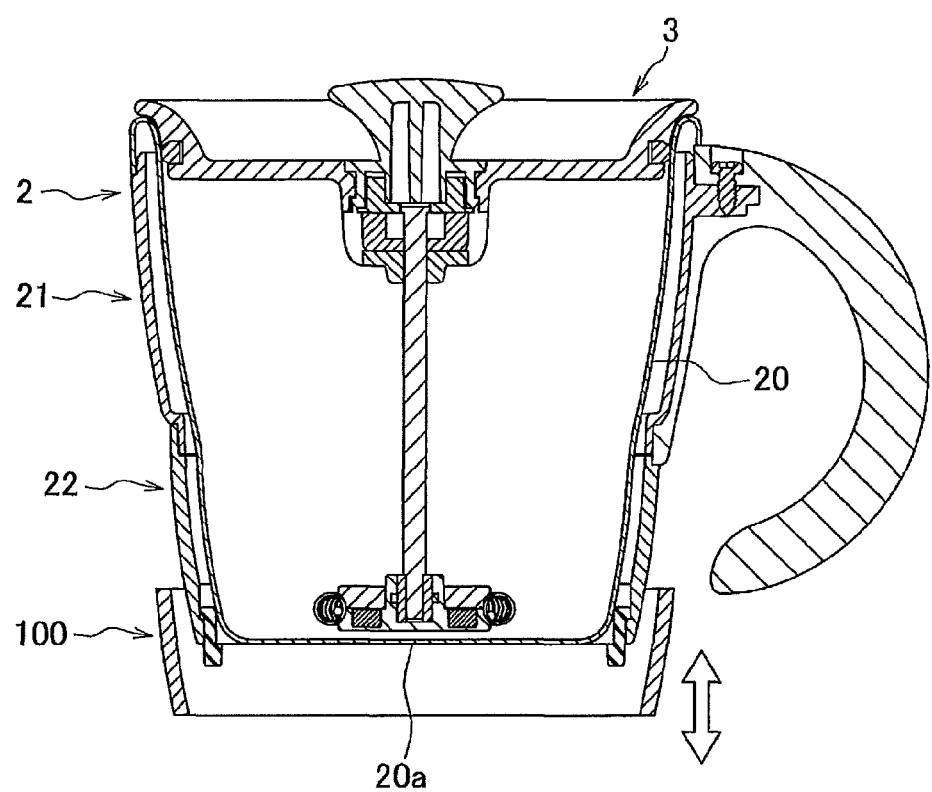
FIG. 13A illustrates a structure of a cover at a lower part of the cup body (first embodiment).

FIG. 13 illustrates a configuration of a cover according to the first embodiment. FIG. 13A is a view illustrating a state in which the cup body 2 is removed from the base body 1. A cover member 100 is formed to be movable in the vertical direction on the outer peripheral surface of the lower cup support body 22 composing the cup body 2. When the cup body 2 is removed, the cover member 100 moves down with its own weight. Therefore, the bottom 20*a* of the beverage container 20 is difficult to be touched.

Figure 13B:
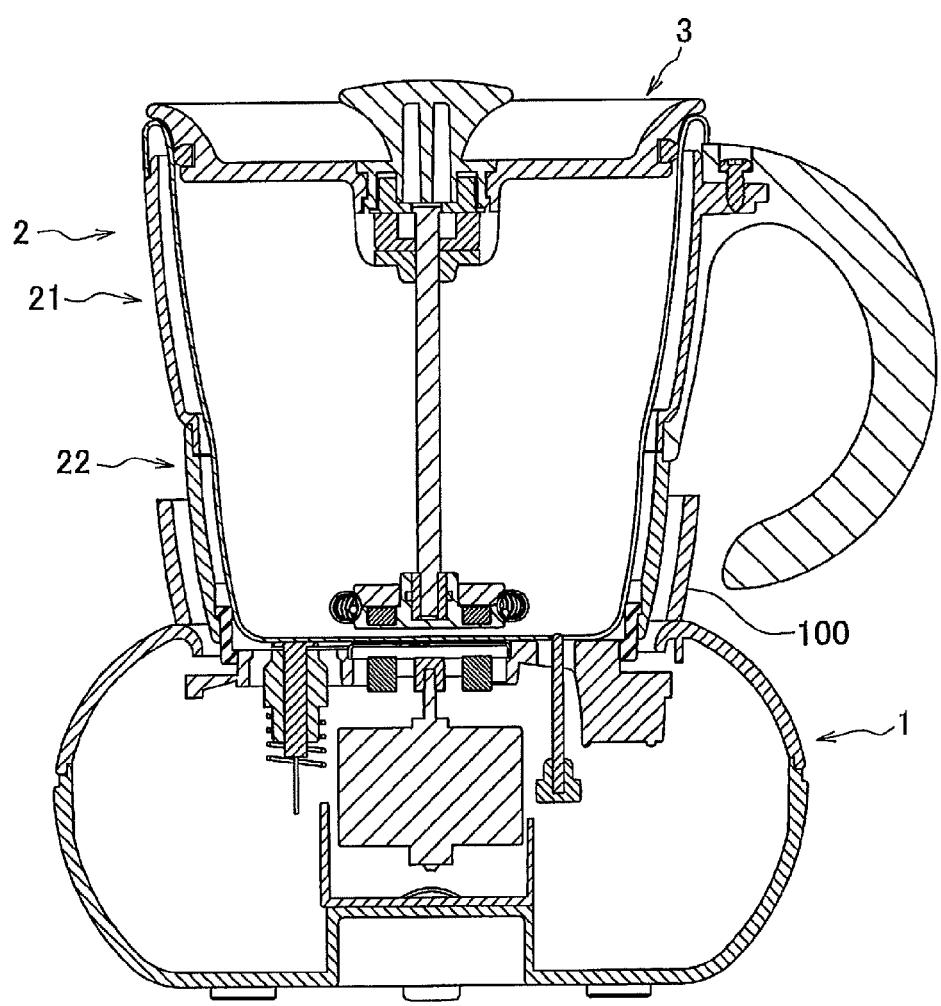
FIG. 13B illustrates a structure of a cover at a lower part of the cup body (first embodiment).

On the other hand, when the cup body 2 is placed on the base body 1 as illustrated in FIG. 13B, the cover member 100 is lifted upward. Note that the range of the vertical motion of the cover member 100 is restricted by a stopper not illustrated.

<Configuration of Cover According to Second Embodiment>

Figure 14A:
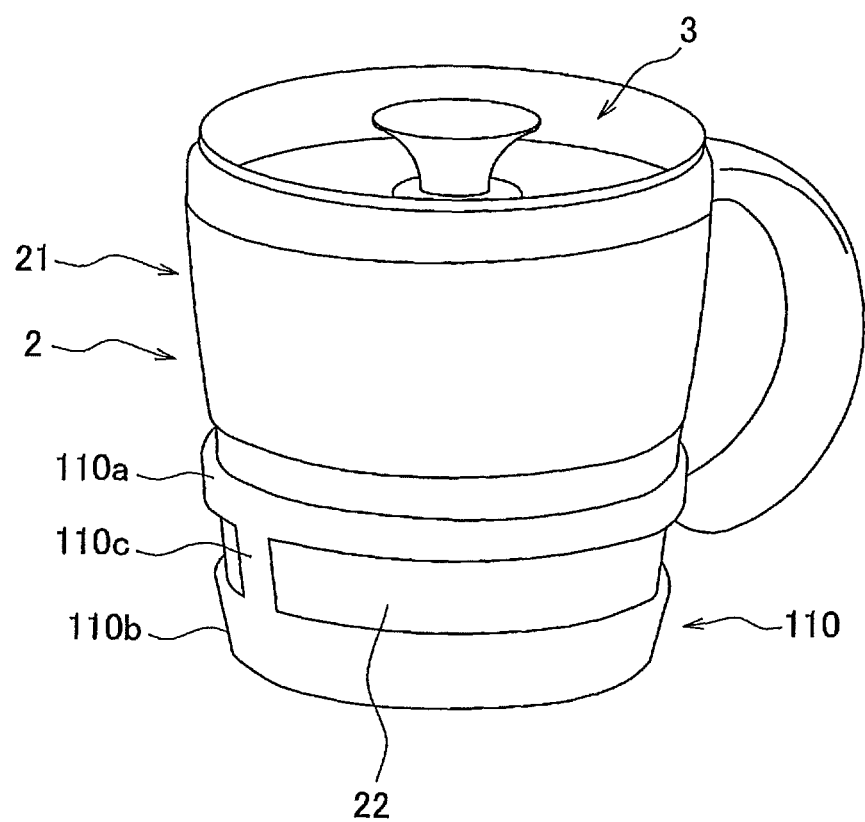
FIG. 14A illustrates a structure of a cover at a lower part of the cup body (second embodiment).
Figure 14B:
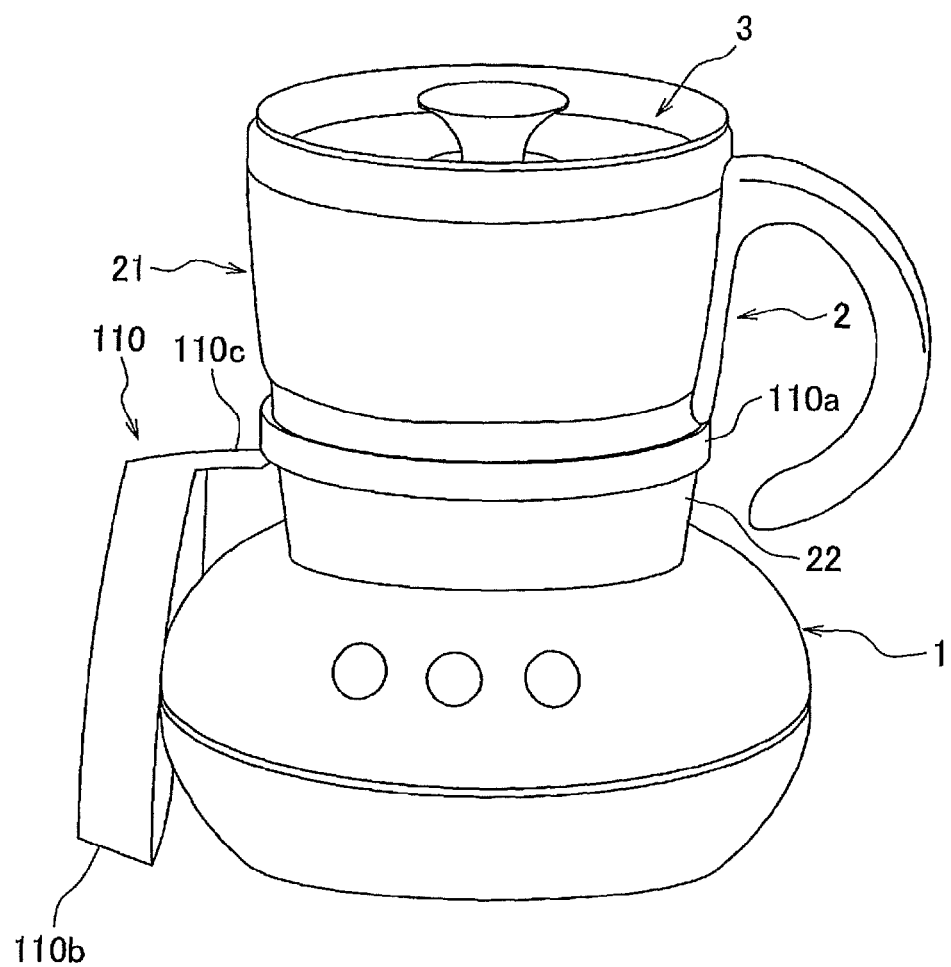
FIG. 14B illustrates a structure of a cover at a lower part of the cup body (second embodiment).
Figure 14C:
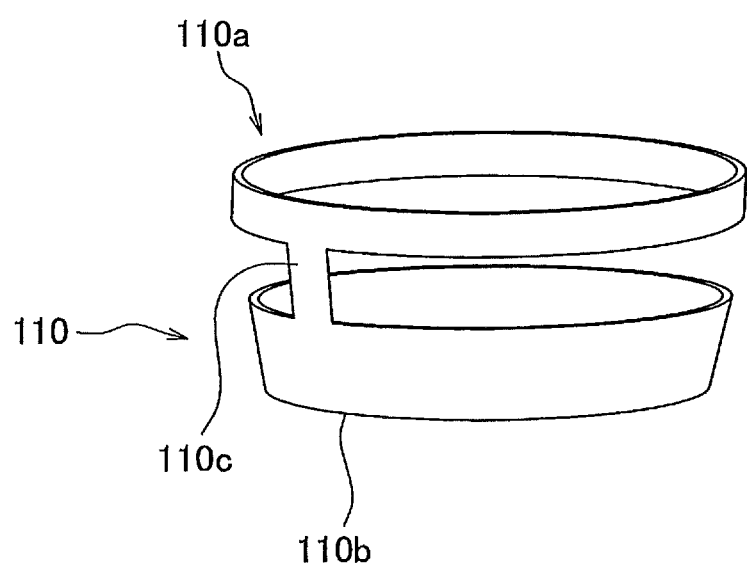
FIG. 14C illustrates a structure of a cover at a lower part of the cup body (second embodiment).

FIG. 14 illustrates a configuration of a cover according to a second embodiment. As illustrated in FIG. 14C, a cover member 110 includes a ring part 110*a*, a bottom lid part 110*b*, and a connection part 110*c* connecting the ring part 110*a* and the bottom lid part 110*b* to each other, the ring part 110*a*, the bottom lid part 110*b*, and the connection part 110*c* being formed integrally with one another. The cover member 110 is made of a soft material such as silicon. Since the bottom lid part 110*b* is provided, the bottom 20*a* of the beverage container 20 is completely covered.

As illustrated in FIG. 14B, the ring part 110*a* of the cover member 110 can be configured to be fixed on the peripheral surface of the lower cup support body 22. The cover member 110 has flexibility. Therefore, when the cup body 2 is placed on the base body 1, the bottom lid part 110*b* can be placed out of the way by bending the connection part 110*c*. In addition, since the ring part 110*a* is fixed to the lower cup support body 22, there is no risk of loss of the cover member 110.

FIG. 14A is a view illustrating a state in which the cup body 2 is removed. If the bottom lid part 110*b* is covered on the bottom 20*a* of the beverage container 20, the cup body 2 can be directly placed onto a table or the like without being directly touched on its bottom with one's hand.

<Configuration of Cover According to Third Embodiment>

Figure 15A:
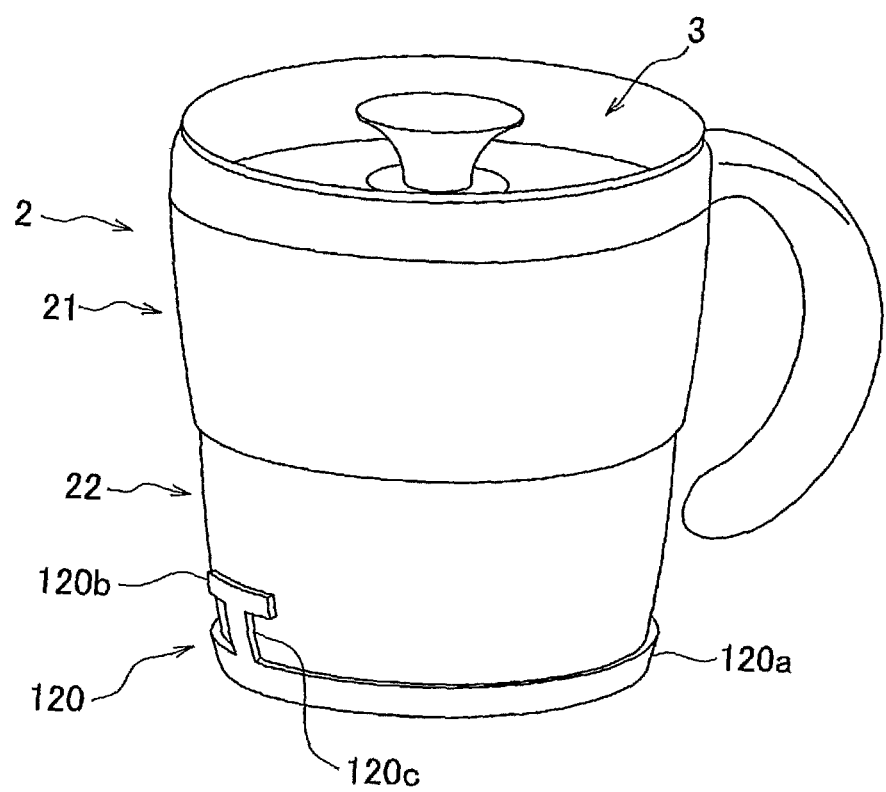
FIG. 15A illustrates a structure of a cover at a lower part of the cup body (third embodiment).
Figure 15B:
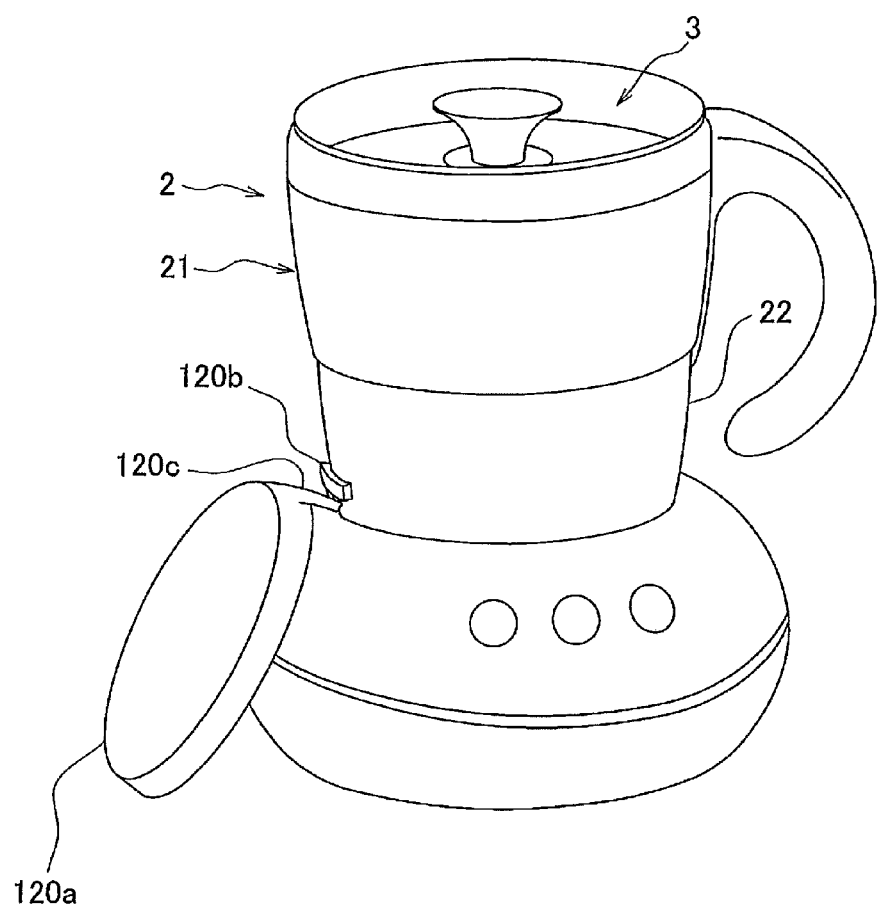
FIG. 15B illustrates a structure of a cover at a lower part of the cup body (third embodiment).

FIG. 15 illustrates a configuration of a cover according to a third embodiment. A cover member 120 includes a bottom lid part 120*a*, a fixing part 120*b*, and a communication part 120*c* connecting the bottom lid part 120*a* and the fixing part 120*b* to each other, the bottom lid part 120*a*, the fixing part 120*b*, and the communication part 120*c* being formed integrally with one another. The cover member 120 is made of a soft material such as silicon. Since the bottom lid part 120*a* is provided, the bottom 20*a* of the beverage container 20 is completely covered.

As illustrated in FIG. 15, the fixing part 120*b* is fixed on the outer surface of the lower cup support body 22 of the cup body 2. The fixing part 120*b* can be fixed with any appropriate methods using a screw or with bonding. The cover member 120 has flexibility. Therefore, when the cup body 2 is placed on the base body 1, the bottom lid part 120*a* can be placed out of the way by bending the connection part 120c. In addition, since the fixing part 120b is fixed to the lower cup support body 22, there is no risk of loss of the cover member 120.

FIG. 15A is a view illustrating a state in which the cup body 2 is removed. If the bottom lid part 120a is covered on the bottom 20a of the beverage container 20, the cup body 2 can be directly placed onto a table or the like without being directly touched on its bottom with one's hand.

<Configuration of Cover According to Fourth Embodiment>

Figure 16A:
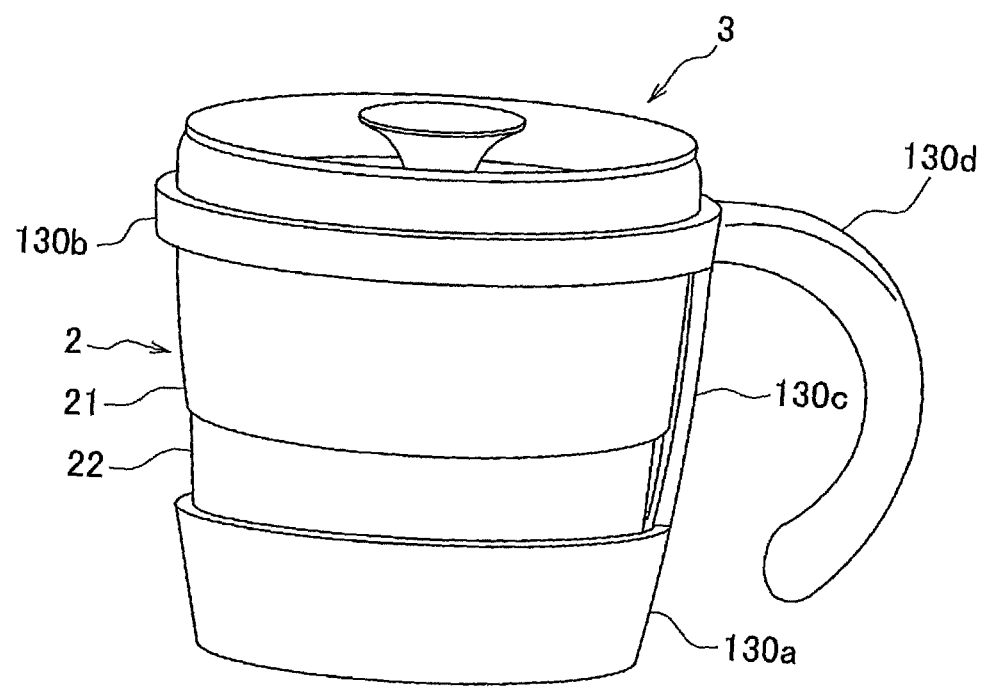
FIG. 16A illustrates a structure of a cover at a lower part of the cup body (fourth embodiment).
Figure 16B:
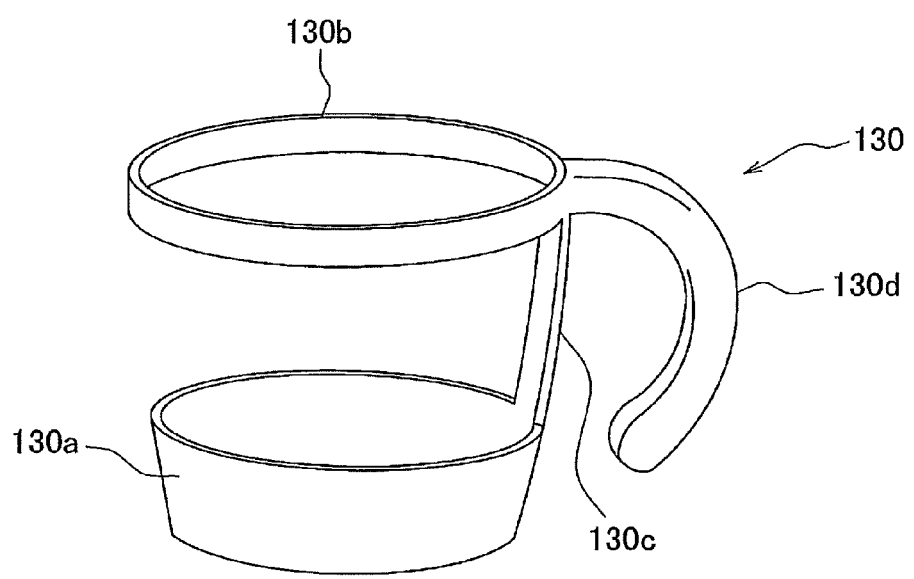
FIG. 16B illustrates a structure of a cover at a lower part of the cup body (fourth embodiment).

FIG. 16 illustrates a configuration of a cover according to a fourth embodiment. A cover member 130 includes a bottom lid part 130a, a ring part 130b, a communication part 130c connecting the bottom lid part 130a and the ring part 130b to each other, and a handle part 130d, the bottom lid part 130a, the ring part 130b, the communication part 130c, and the handle part 130d being formed integrally with one another. This cover member 130 is a member separate from the cup body 2. When the cup body 2 is removed from the base body 1, the cup body 2 is inserted from the ring part 130b of the cover member 130 as illustrated in FIG. 16A.

Since the bottom lid part 130a is provided, the bottom 20a of the beverage container 20 is completely covered. The cup body 2 can be placed onto a table or the like with the cover member 130 being attached thereto.

<Configuration of Cover According to Fifth Embodiment>

Figure 17A:
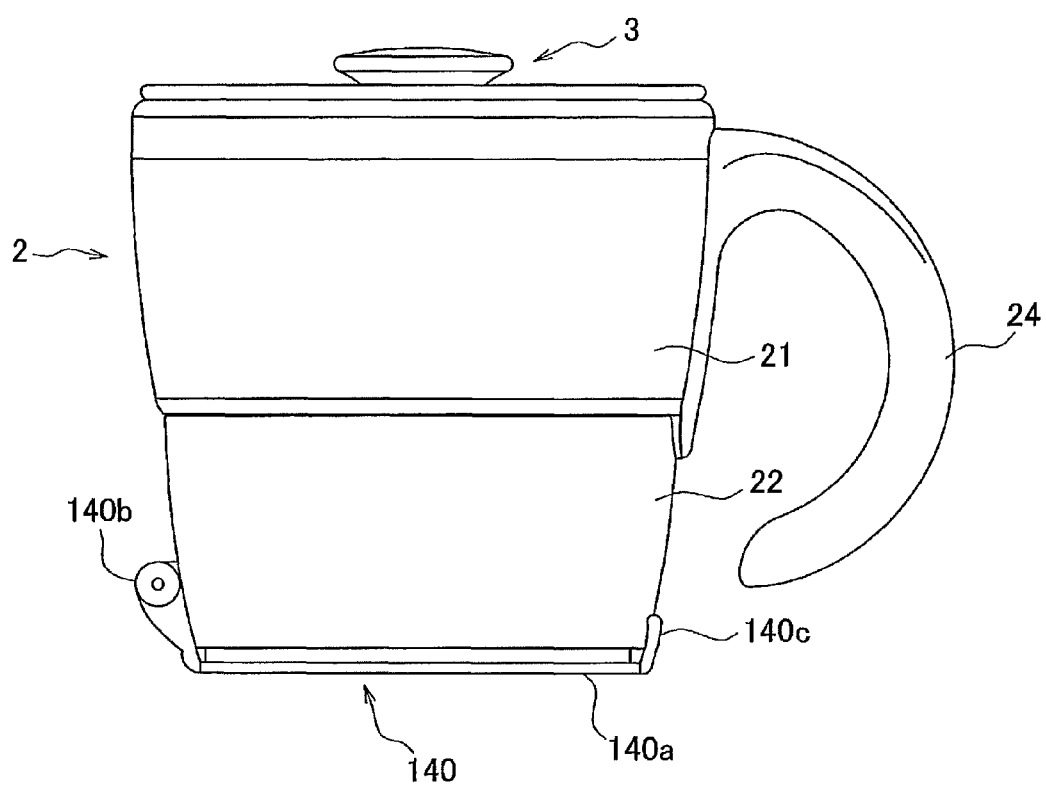
FIG. 17A illustrates a structure of a cover at a lower part of the cup body (fifth embodiment).
Figure 17B:
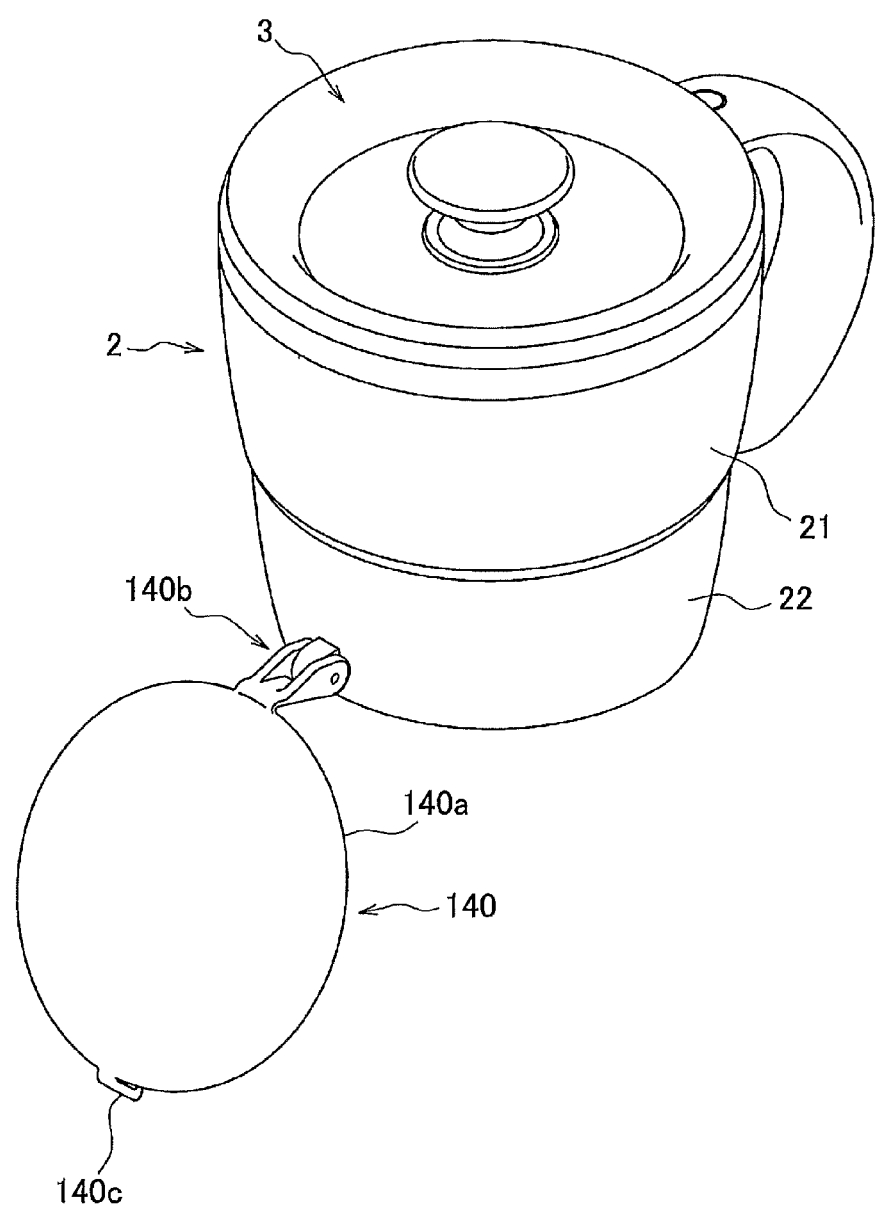
FIG. 17B illustrates a structure of a cover at a lower part of the cup body (fifth embodiment).

FIG. 17 illustrates a configuration of a cover according to a fifth embodiment. A cover member 140 includes a bottom lid part 140a and a hinge part 140b. The hinge part 140b is connected to the lower cup support body 22 of the cup body 2. A locking part 140c is integrally provided on the bottom lid part 140a at the side opposite to the hinge part 140b. When the cup body 2 is removed from the base body 1, the locking part 140b is locked to a locked part 22b formed on the outer surface of the lower cup support body 22 as illustrated in FIG. 17A.

When the cup body 2 is placed on the base body 1, the locking state may be canceled. Locking or releasing the locking part 140b can easily be performed by forming the locking part 140b from resin having flexibility.

Another Embodiment

In the present embodiment, the number of the permanent magnets disposed along the circumferential direction is four. However, it is not limited thereto. Two or three, or five or more permanent magnets can be disposed. The cover member 130 can be integrally formed with resin molding. However, it is preferable that a surface made of silicon is formed on the bottom surface of the bottom lid part 130a on which the beverage container 20 of the cup body 2 is placed.

In the present embodiment, the stirring head is rotated with the combination of the first permanent magnet group and the second permanent magnet group. However, the permanent magnet group may be composed of an electromagnet. For example, an electromagnet coil can be applied instead of the second permanent magnet group 61A as a magnetic drive mechanism.

The present embodiment describes that the shaft 51 and the stirring head 50 are supported so as to be relatively rotatable with respect to the lid body 30. In place of this structure, the lid body 30 and the shaft 51 are connected to each other so as not to relatively rotate, and the stirring head 50 can be connected to the shaft 51 so as to be relatively rotatable.

In the present embodiment, the stirring blade 54 has a coil shape. However, the shape of the blade is not limited to a specific shape.

The milk foamer according to the present embodiment has a function of creating both foam milk and hot milk. However, the milk foamer can be configured to have a function of creating only foam milk, or a function of creating another type of beverage.

In the present embodiment, detection by the head detection unit 82 is performed with a current detection. However, it is not limited thereto. The presence of a stirring head may be detected by a sensor (such as an optical sensor or a mechanical sensor).

DESCRIPTION OF REFERENCE SIGNS

1 Base body
2 Cup body
3 Cup lid
4 Heater cover
5 Stirring mechanism
10 Lower base
10b Storage concave part
11 Upper base
11a, 11b, 11c Operation unit
15 Motor (actuator)
20 Beverage container
20a Bottom
21 Upper cup support body
22 Lower cup support body
23 Bottom cup support body
50 Stirring head
51 Shaft
52 First head composing member (support member)
52 First concave part (support surface)
53 Second head composing member (support member)
53a Second concave part (support surface)
54 Stirring blade
60 First permanent magnet
60A First permanent magnet group
61 Second permanent magnet
61A Second permanent magnet group
62 Heater (heating device)
70 Temperature sensor
71 Cup detection sensor
100, 110, 120, 130, 140 Cover member

The invention claimed is:

1. A milk foamer comprising:
a base body;
a cup body placed on the base body;
a cup lid placed on the cup body; and
a stirring mechanism configured to stir milk in the cup body, wherein the stirring mechanism includes a stirring head and a shaft for supporting the stirring head, and a magnetic drive mechanism configured to magnetically drive the stirring head is provided to the base body;
wherein the stirring head includes a first permanent magnet group disposed at equal intervals along a circumferential direction of rotation, and wherein the magnetic drive mechanism includes a second permanent magnet group disposed opposite to the first permanent magnet group, and an actuator for rotating the second permanent magnet group.

2. The milk foamer according to claim 1, wherein the stirring head includes a stirring blade provided around the first permanent magnet group.

3. The milk foamer according to claim 2, wherein the stirring blade is mounted to a support surface formed on a support member supporting the first permanent magnet group.

4. The milk foamer according to claim 1, wherein one or more types of the stirring heads are prepared, and attached to the shaft so as to be exchangeable.

5. The milk foamer according to claim 4, wherein a storage part storing the stirring head is provided to the base body.

6. The milk foamer according to claim 5, wherein the storage part is a storage concave part formed on a bottom of the base body for holding the stirring head with magnetic force.

7. The milk foamer according to claim 1, wherein a heating device is provided to surround the first permanent magnet group.

8. The milk foamer according to claim 1, wherein a sensor for detecting a presence of the cup body is provided to the base body.

9. The milk foamer according to claim 7, wherein a heater cover covering the heating surface of the heating device is rotatably and pivotally supported to the base body.

10. The milk foamer according to claim 1, wherein the cup body includes at least a beverage container, and an upper cup support body and a bottom cup support body which are disposed around the beverage container, and the cup body is configured such that a lower end of the bottom cup support body projects from the bottom surface of the beverage container.

11. The milk foamer according to claim 10, wherein the bottom cup support body is made of a material having flexibility.

12. The milk foamer according to claim 10 or 11, wherein a cover member for covering the bottom surface of the beverage container is provided, the cover member being capable of being set to a state to cover the bottom surface and a state to expose the bottom surface.

13. The milk foamer according to claim 12, wherein the cover member is rotatably and pivotally supported to the outer surface of the cup body.

14. The milk foamer according to claim 1, comprising a head detection unit detecting whether the stirring head is attached to the shaft or not.

* * * * *